(12) United States Patent
Woolbright

(10) Patent No.: US 11,425,868 B2
(45) Date of Patent: *Aug. 30, 2022

(54) SYSTEMS, DEVICES, AND/OR METHODS FOR COVERING STRUCTURES

(71) Applicant: Conwed Plastics Acquisition Company V LLC, Minneapolis, MN (US)

(72) Inventor: Mark Woolbright, St. Louis, MO (US)

(73) Assignee: Greenwall Ventures, LLC, Saint Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/952,603

(22) Filed: Nov. 19, 2020

(65) Prior Publication Data

US 2021/0084829 A1 Mar. 25, 2021

Related U.S. Application Data

(63) Continuation of application No. 15/067,545, filed on Mar. 11, 2016, now Pat. No. 10,856,471.

(60) Provisional application No. 62/306,202, filed on Mar. 10, 2016, provisional application No. 62/132,802, filed on Mar. 13, 2015.

(51) Int. Cl.
*A01G 9/02* (2018.01)

(52) U.S. Cl.
CPC .............. *A01G 9/025* (2013.01); *Y02P 60/20* (2015.11)

(58) Field of Classification Search
CPC ......... A01G 9/023; A01G 9/022; A01G 9/025
See application file for complete search history.

(56) References Cited

U.S. PATENT DOCUMENTS

| 4,255,896 A * | 3/1981 | Carl | A01G 31/06 47/62 C |
|---|---|---|---|
| 2011/0059518 A1* | 3/2011 | Bribach | A01G 9/025 435/266 |
| 2011/0088318 A1* | 4/2011 | Tsai | A01G 9/025 47/65.7 |
| 2011/0088319 A1* | 4/2011 | Koumoudis | A01G 9/025 47/66.6 |
| 2011/0094153 A1* | 4/2011 | Urriola | A01G 9/025 47/65.7 |
| 2011/0302837 A1* | 12/2011 | Chen | B32B 5/26 47/65.8 |
| 2012/0020745 A1* | 1/2012 | Miller | E02D 29/0208 405/284 |
| 2013/0152467 A1* | 6/2013 | Chang | A01G 9/025 47/82 |

(Continued)

FOREIGN PATENT DOCUMENTS

| AT | 11006 U1 * | 3/2010 | ............ A01G 9/025 |
|---|---|---|---|
| CA | 2779344 A1 * | 5/2011 | ............ A01G 9/02 |

(Continued)

*Primary Examiner* — Monica L Barlow
*Assistant Examiner* — Aaron M Rodziwicz
(74) *Attorney, Agent, or Firm* — Michael N. Haynes; Michael Haynes PLC

(57) ABSTRACT

Certain exemplary embodiments can provide a system, machine, device, and/or manufacture adapted for and/or resulting from, and/or a method configured for, activities that can comprise and/or relate to, installing a support system for a green wall, the support system comprising a plurality of trays that are configured to interface with a securement system.

18 Claims, 12 Drawing Sheets

(56) References Cited

U.S. PATENT DOCUMENTS

| | | | | |
|---|---|---|---|---|
| 2013/0219788 A1* | 8/2013 | VanLente | ............... | A01G 9/022 |
| | | | | 47/62 A |
| 2014/0223815 A1* | 8/2014 | Kuo | ....................... | A01G 9/025 |
| | | | | 47/82 |
| 2014/0318010 A1* | 10/2014 | Tomlinson | ............ | A01G 9/025 |
| | | | | 47/65.8 |

FOREIGN PATENT DOCUMENTS

| | | | | | |
|---|---|---|---|---|---|
| CA | 2890869 A1 | * | 5/2014 | ............. | A01G 9/025 |
| CA | 2892099 A1 | * | 6/2014 | ............. | E04C 1/397 |
| EP | 2481279 A1 | * | 8/2012 | ............. | A01G 9/025 |
| EP | 3011826 A1 | * | 4/2016 | ............. | A01G 9/025 |
| FR | 2872529 A1 | * | 1/2006 | ............ | E02D 17/202 |
| FR | 2902966 A1 | * | 1/2008 | ............. | A01G 9/025 |
| FR | 2902967 A1 | * | 1/2008 | ............. | A01G 9/025 |
| FR | 2994632 A1 | * | 2/2014 | ............. | A01G 9/025 |
| WO | WO-2014041243 A1 | * | 3/2014 | ............. | A01G 9/025 |
| WO | WO-2014085944 A2 | * | 6/2014 | ............. | A01G 9/025 |
| WO | WO-2015188285 A1 | * | 12/2015 | ............. | A01G 9/025 |

\* cited by examiner

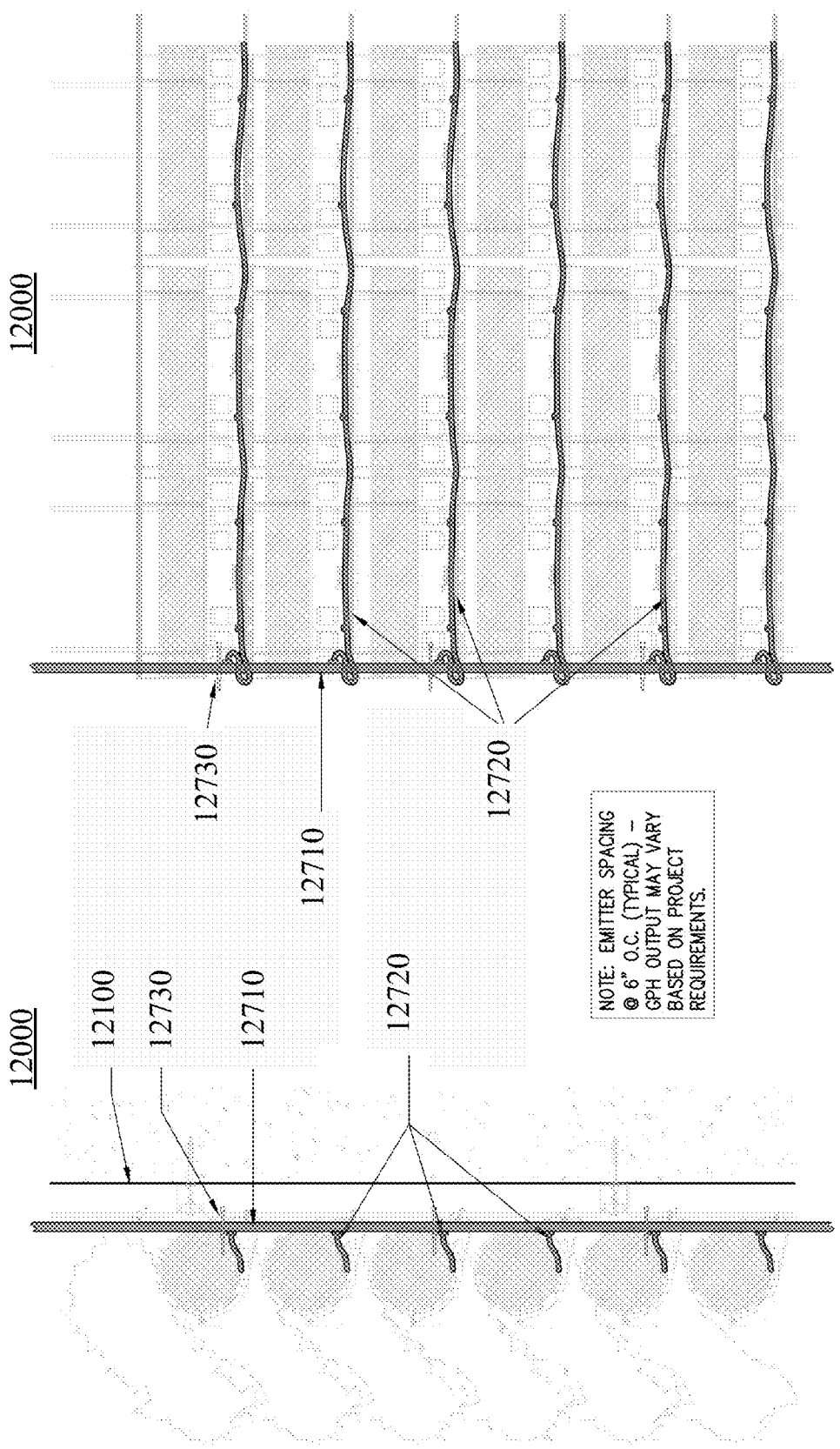

SYSTEMS, DEVICES, AND/OR METHODS FOR COVERING STRUCTURES

CROSS-REFERENCES TO RELATED APPLICATIONS

This application claims priority to, and incorporates by reference herein in its entirety: United States Provisional Patent Application 62/132,802, filed 13 Mar. 2015, and United States Provisional Patent Application 62/306,202, filed 10 Mar. 2016 (the "097 Provisional") (collectively hereinafter the "Provisional Applications").

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the herein incorporated exemplary drawings of the Provisional Applications (for which the drawings of the 097 Provisional are labeled in a "PN" format, where "N" is a whole number), as well as the accompanying exemplary drawings in which:

FIG. 12A is a side view of an exemplary embodiment of a system; and

FIG. 12B is a front view of an exemplary embodiment of a system.

DESCRIPTION

Figure 1:
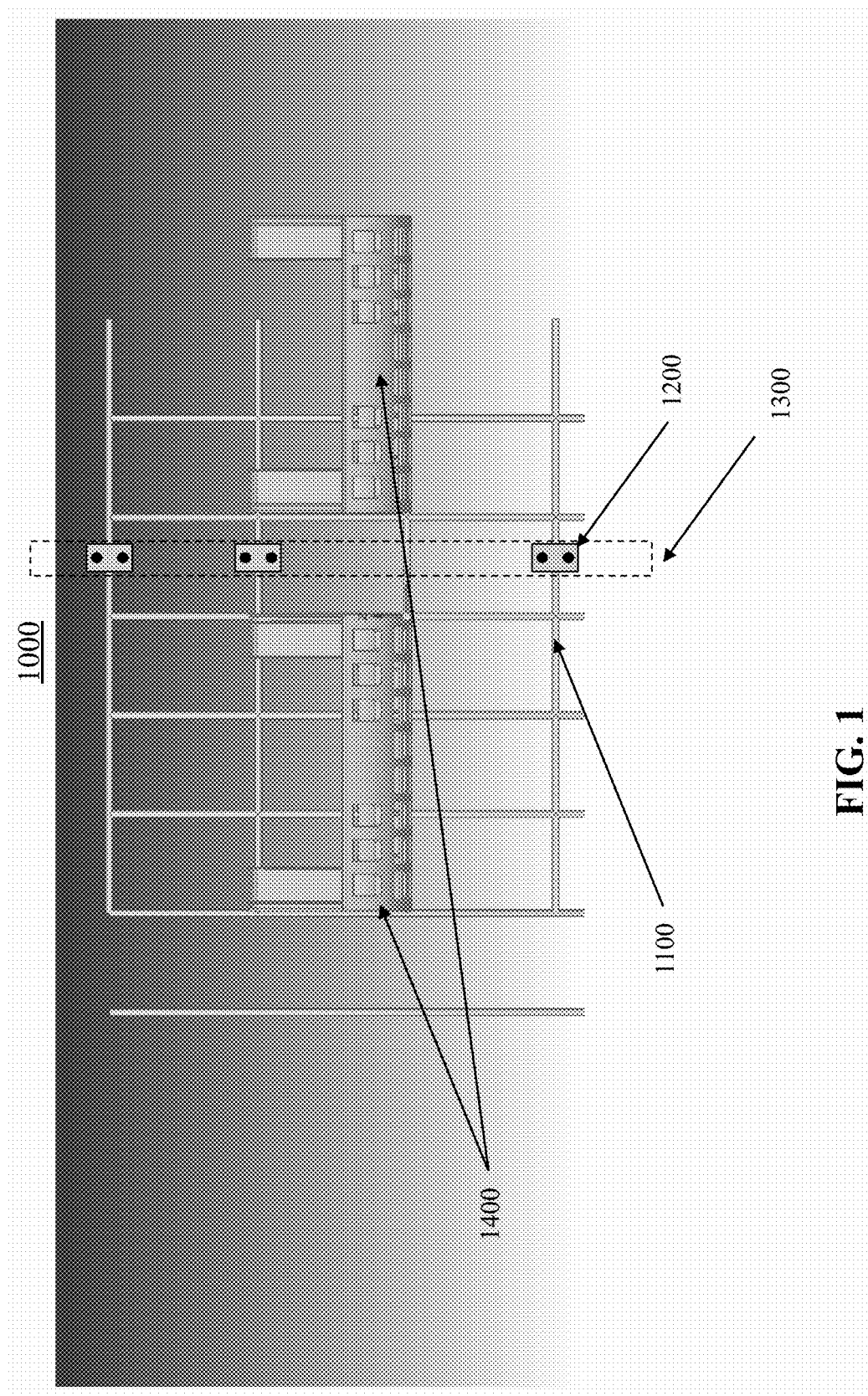
FIG. 1 is a front view of an exemplary embodiment of a system.

As described herein, among other things, the problem of at least partially covering an existing structure (such as a wall inside or outside of a building, retaining wall, partition, divider, frame trellis, lattice, screen, grill, opening, barrier, concealment, and/or fence) with a aesthetically pleasing and/or sustained display of plants in a economical manner can be uniquely solved by:

stacking courses of horizontally-extending tubular mesh socks that contain a plant growing medium, the socks secured to a green wall securement by trough-like trays that securely, yet non-destructively removeably, attach to the green wall securement, wherein:

the socks are configured to contain the plant growing medium and/or to prevent erosion and/or loss of the plant growing medium;

the trays are configured to resist vertical movement of the socks once the socks are installed in the trays;

the trays are configured to resist horizontal movement of the socks once the socks are installed in the trays; and/or the trays are configured to secure an irrigation conduit that extends parallel to a selected course of the courses.

Referring to FIGS. 1-12, certain exemplary embodiments can provide a living wall or green wall (see, e.g., FIGS. 4, 10, and 11, and items P1, P2, and P52 in the incorporated 097 Provisional) by combining horizontally-spanning members of green wall securements (see, e.g., FIGS. 2, 5, 10, and 11, and items P5, P15, and P27 in the incorporated 097 Provisional, etc.) with plantable lightweight polymer basket-like, planter-like, trough-like, and/or tray-like modules ("trays") (see, e.g., FIGS. 1-8, 10, and 11, and items P5, P12, and P38 in the incorporated 097 Provisional, etc.). A tray can be configured to be integral to, be hung from, be supported by, and/or be secured to the green wall securements. A tray can be configured to support and/or secure one or more tubular mesh socks (see, e.g., FIGS. 4, 10, and 11, and items P6, P51, P57, and P71 in the incorporated 097 Provisional, etc.), such as a Filtrexx® Soxx™ (e.g., FilterSoxx™, Soil-Soxx®, GroSoxx®, GardenSoxx®, etc., available from Filtrexx International of Akron, Ohio), any of which can be filled with a plant growing medium that supports, facilitates, and/or encourages the growth of plants. Multiple stacked horizontal courses (see, e.g., FIGS. 3, 4, 11, and 12, and items P31, P32, and P34 in the incorporated 097 Provisional, etc.) of this combination of green wall securement-attached trays and filled socks can create a partial or complete, vertical assembly, which when planted can form an aesthetic and/or edible vegetative structure and/or covering and/or fascia for a structure, which is generally referred to herein as a "green wall". The green wall can be configured to fulfill greening, cooling, and/or agricultural uses. The exposed face of the green wall assembly can be partially, substantially, and/or nearly completely plantable, and once planted, can thereby grow into a "living" green wall. In certain exemplary embodiments, the green wall can be configured to have a smooth overall exposed green wall face. In certain exemplary embodiments, the green wall can be configured to, in outdoor installations, allow rain to fall on the wall face and/or allow plants to grow up out of the socks and/or through the green wall assembly.

In certain exemplary embodiments, the green wall securements can be formed from one or more panels, such as mesh panels and/or wire mesh panels (see, e.g., FIGS. 2, 3, 5, 10, and 11, and items P5, P17, and P56 in the incorporated 097 Provisional, etc.). Any of the panels can comprise horizontally-spanning members. Any of the panels can measure from approximately 1 foot to approximately 15 feet wide, including all values and sub-ranges therebetween, by approximately 0.5 foot to approximately 15 feet tall, including all values and sub-ranges therebetween, thereby presenting from approximately 1 to approximately 225 square feet (including all values and sub-ranges therebetween) of wall facing. In certain exemplary embodiments, the green wall securements can be formed from one or more horizontally-spanning pipes, tubes, bars, struts, studs, spikes, sticks, poles, nails, cables, ties, ropes, wires, etc.).

Figure 2:
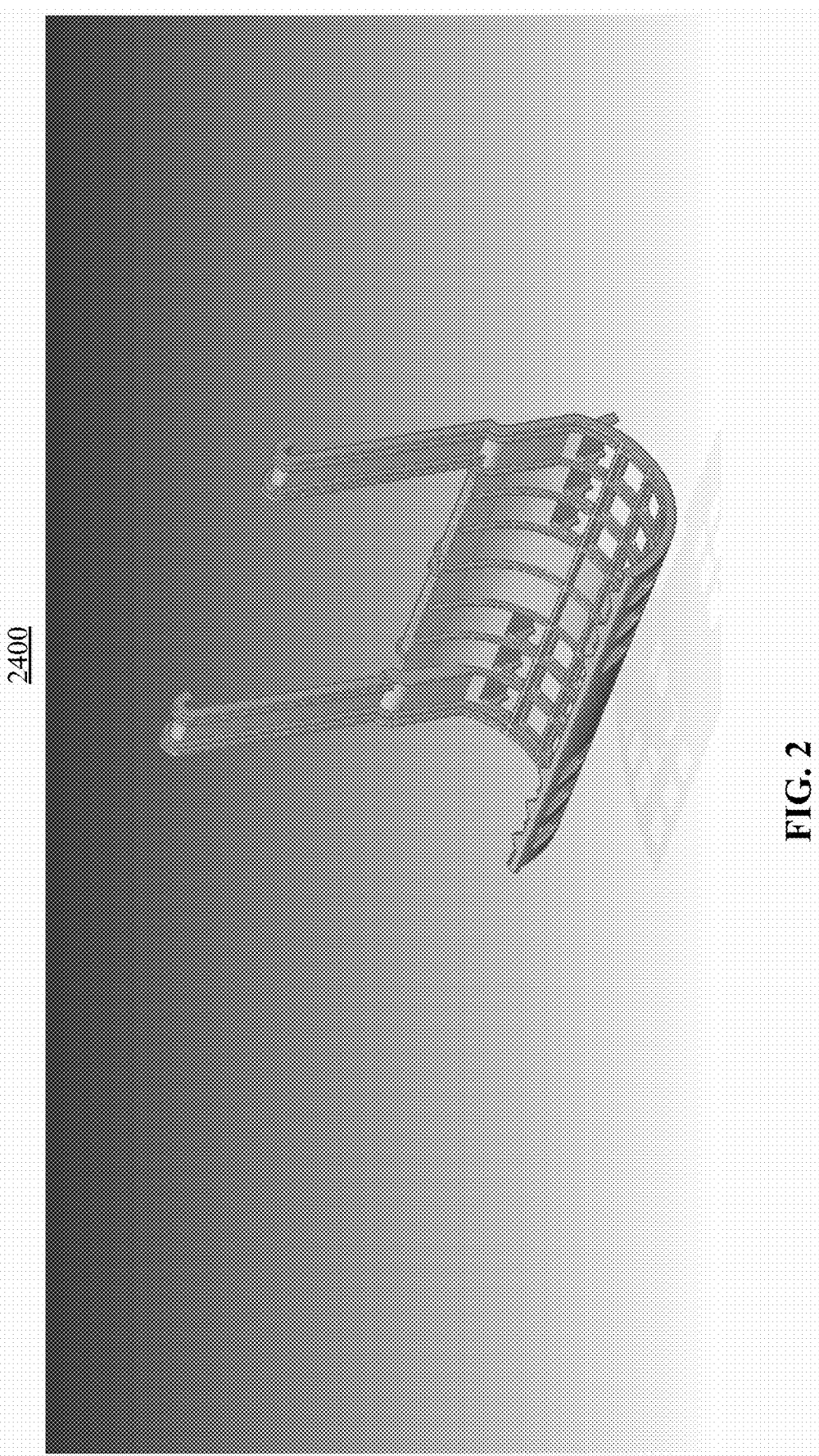
FIG. 2 is a perspective view of an exemplary embodiment of a tray.
Figure 11:
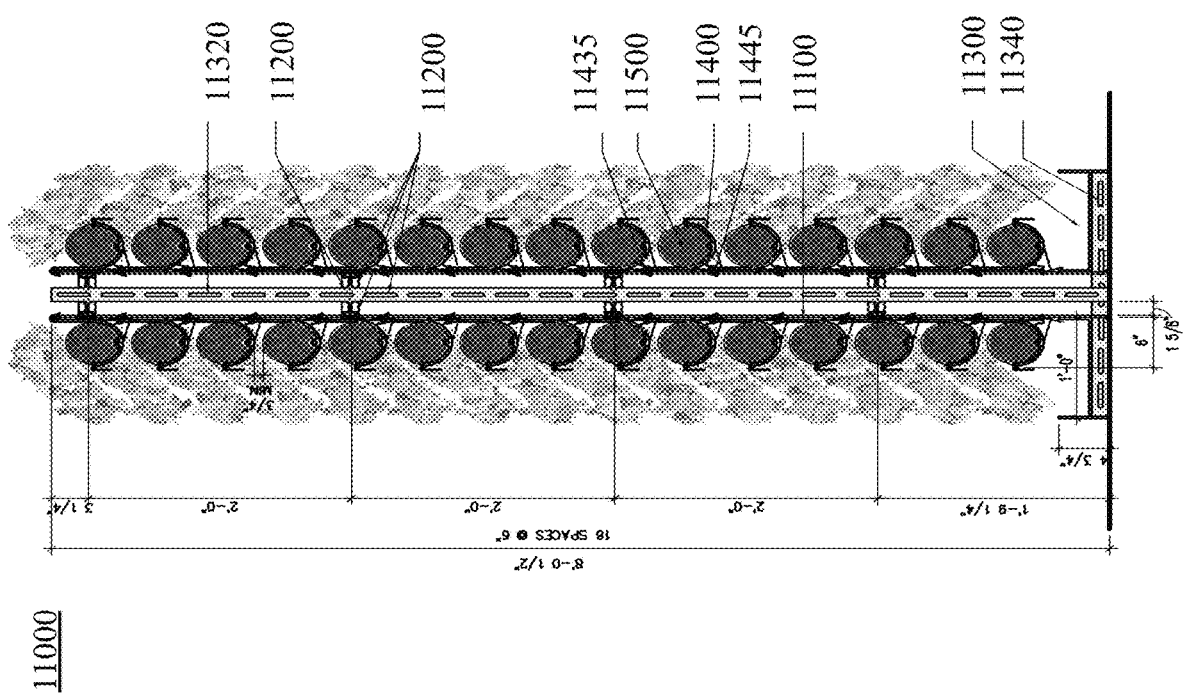
FIG. 11 is a side view of an exemplary embodiment of a system.

The green wall securements can form an array of securement members that can be interlocked side-to-side and/or top-to-bottom (see, e.g., FIGS. 2 and 11, and items P17 and P56 in the incorporated 097 Provisional, etc.). The green wall securements can avoid providing loose and/or exposed components that can snag equipment, clothing, and/or skin. Side trim, tops, and/or gutters can be applied to and/or installed on the securements, such as to avoid contact with exposed edges of the securements.

The green wall securements themselves can be free-standing and/or self-supporting (see, e.g., FIG. 11 and items P47, P50, and P52 in the incorporated 097 Provisional, etc.). The securements can be partially and/or completely attached to, secured to, and/or supported by at least one existing structure (e.g., at least one interior wall, exterior wall, retaining wall, partition, divider, frame, trellis, arbor, upright, column, pillar, rail, deck rail, stair rail, joist, beam, bar, lattice, screen, grill, barrier, concealment, shelf, gate, and/or fence, etc.) (see, e.g., FIGS. 2 and 10, and items P17, P46, and P53 in the incorporated 097 Provisional, etc.). A green wall securement can be attached via at least one attachment (e.g., at least one bracket, brace, plate, strap, hanger, clip, cable, tie, rope, string, wire, spring, weld, rivet, staple, pin, spike, tack, nail, screw, and/or bolt, etc.) (see, e.g., FIGS. 2, 10, and 11, and items P46 and P55 in the incorporated 097 Provisional, etc.), to the at least one existing structure and/or to at least one load-bearing member (e.g., board, stud, plank, post, shaft, timber, log, leg, spindle, support, newel, baluster, piling, siding, rebar, wire mesh, wire, net, rope, brace, plate, channel, angle, bar, pipe, tube, cord, cable, concrete, mortar, stone, block, and/or brick, etc.) of the existing structure, the attachment(s) configured to provide the green wall securement(s) with sufficient structural support for that securement(s) and/or the trays, socks, growing media, and/or plants, etc. that it is configured to support, secure, and/or attach to the existing structure. In certain exemplary embodiments, the attachment can be a combination of components, such as a Unistrut® metal framing and clip arrangement, pipes or tubes with U-bolts, boards with nails or screws, etc., that mechanically couples the securement(s) to the structure.

The structure itself can be free-standing, such when the structure is a fence or arbor. The structure can be a component of another structure. The structure to which the securements are attached need not extend in a plane parallel to the securements. That is, the securements can define a securement wall onto which trays are mounted, and that securement wall can be installed adjacent to, e.g., an existing building wall, but be attached not to the building wall but instead to another structure or structural component, such as a different building wall, a floor, a ceiling, etc., which can allow the securements to be hung from above, supported from below, etc. (see, e.g., item P62 in the incorporated 097 Provisional). Side trim, tops, and/or gutters can be applied to and/or installed on the securements, such as to facilitate attachment of the securements to any desired structure, such as any of the aforementioned structures.

Via the attachment, another off-set device, and/or the securement itself, one or more of the green wall securements can be partially, intermittently, and/or separated, off-set and/or spaced apart from the structure to which it is attached, thereby forming a continuous, discontinuous, constant, and/or varying gap between the securement and the structure (see, e.g., FIG. 11, and items P46 and P54 in the incorporated 097 Provisional, etc.). The gap can be filled to any degree with any material (i.e., the gap can be empty and filled with air, partially filled, and/or filled, etc.). Located within the gap can be located a buffer material, such as a predetermined quantity of stone wool (e.g., Rockwool®), mineral fiber, natural fiber, polymer, expanded polystyrene foam board (e.g., Styrofoam®), polyethylene sheeting, sprayed polyurethane foam, cellulose, glass wool (i.e., fiber-glass), cellular glass (e.g., FoamGlas®), animal wool, organic fibers, etc. (see, e.g., FIG. 11, and items P46 and P54 in the incorporated 097 Provisional, etc.). The buffer material can have properties that enable it to and/or operatively serve as, and/or can be configured to serve as, a highly and/or functional thermal insulation, radiation barrier, vibration dampener, acoustic insulation, fire barrier, moisture barrier, etc. The buffer material can be partially, substantially, and/or not at all non-combustible, combustion resistant, liquid and/or vapor permeable, liquid and/or vapor impermeable, mold-resistant, freeze-thaw cycle resistant, root penetrable, non-destructively removable from the gap, slump resistant, UV degradation resistant, recycled, recyclable, etc.

A tray can be defined by a trough-like portion, which can be latticed, meshed, apertured, semi-circular, and/or sock-supporting, and/or which can be attached to and/or integral with one, two, or more support members, such as one or more back posts, hangers, risers, and/or legs (see, e.g., FIGS. 1, 2, 5, 6, 7, 8, and 10, and items P14, P38, P67, and P69 in the incorporated 097 Provisional, etc.). Viewed on longitudinal end, a tray can resemble a upward-facing and/or semi-circular structure that is connected to and/or has support members, such as vertically extending risers and/or legs from any of which extends at least one upward-facing and/or downward-facing hook. Any back post, hanger, riser, leg, and/or hook can be vertically aligned, vertically not aligned, horizontally aligned, and/or horizontally not aligned with a back post, hanger, riser, leg, and/or hook that belongs to the same tray, a horizontally adjacent tray, vertically adjacent tray, etc. As another example, the support members can be horizontally-spanning, define a portion of the trough itself, and/or attach to the green wall securements via at least one attachment (e.g., at least one bracket, strap, clip, wire, weld, rivet, staple, pin, spike, tack, nail, screw, and/or bolt, etc.).

Viewed from a longitudinal end, a tray can comprise a partially-circular or semi-circular tray wall that defines a front portion, a bottom portion, and/or a back portion, where, when in operation, the front portion is the portion of the tray from which plants of the living wall would be most visible, the bottom portion faces downward, and/or the back portion faces and/or is adjacent to the securement and/or structure (see, e.g., FIGS. 1, 5, 6, 7, and 10, and items P11, P14, and P38 in the incorporated 097 Provisional, etc.). The back portion of the tray can be integral to and/or connect to one or more vertically extending hanger or riser portions (see, e.g., FIGS. 1, 5, 6, 7, 8, and 10, and items P14 and P19 in the incorporated 097 Provisional, etc.). Any of the hanger or riser portions can include a downward-opening hook configured to wrap partially around a horizontally-spanning member of the green wall securement(s). The back and/or bottom of the tray can be integral to and/or connect to one or more vertically extending leg portions. Any of the leg portions can include a upward-opening hook configured to wrap partially around a horizontally-spanning member of the green wall securement(s) (see, e.g., FIGS. 5, 8, and 10, and items P18, P28, and P46 in the incorporated 097 Provisional, etc.). To install the tray onto a green wall securement(s), one or more of the downward-opening hooks and/or upward-opening hooks can flex to receive its adjacent and/or corresponding horizontally-spanning member and then snap back into its prior position while capturing the member, thereby locking the tray to that member and/or to the green wall securement. A tray can be configured to be destructively, non-destructively, easily, and/or not at all connectable and/or removable from a green wall securement. A tray can be formed integrally with a green wall securement. A tray can be configured to be destructively, non-destructively, easily, and/or not at all connectable and/or removable from another tray. A tray can be formed integrally with another tray.

A vertically extending hanger portion and/or leg portion of a tray can be partially and/or solid as needed or desired to provide adequate structural support, integrity, root impermeability, and/or water retention for the tray and/or sock. A vertically extending hanger portion and/or leg portion of a tray can be partially and/or latticed, meshed, and/or apertured as needed or desired to provide adequate weight reduction, cost savings, drainage, root permeability, flexibility, etc.

Viewed from a longitudinal end, a tray can comprise a partially-circular or semi-circular tray wall that defines both an outer side that faces away from the sock and an inner side that faces toward the sock (see, e.g., FIGS. 1, 5, 6, 7, and 8, and items P9, P13, and P14 in the incorporated 097 Provisional, etc.). Any portion of the tray wall can be solid as needed and/or desired to provide adequate structural support and/or integrity for the tray and/or sock and/or to prevent plant roots from extending beyond the tray. Any portion of the tray wall can define integral structural members, such as ribs, that extend, e.g., longitudinally and/or semi-circumferentially, one or more of those ribs potentially serving to strengthen the tray wall and/or provide a mini dam that can retain a desired amount of water in the bottom of the tray (see, e.g., FIGS. 6 and 8, and items P38, P41, P42, and P59 in the incorporated 097 Provisional, etc.). Any portion of the tray wall can include drain holes as needed to prevent water from puddling deeper than desired and/or appropriate for plants growing in that portion of the tray (see, e.g., FIGS. 6 and 8, and items P38, P59, and P67 in the incorporated 097 Provisional, etc.). Any portion of the tray wall can be latticed, grid-like, and/or apertured, potentially with only limited structural members to provide structural integrity and/or maintain a separation between most of the outer side and the inner side, which can join at the top and/or side edges of the tray. By keeping this volume open, the overall weight and/or cost of the tray can be reduced, some or all of the tray can be self-draining, and/or some or all of the tray can allow roots to extend downwards from the sock and/or and/or allow other plant parts (e.g., stems, flowers, etc.) to extend outward through and/or from the tray wall.

The geometry of a tray, a course of trays, and/or a wall of trays can be configured to constrain and/or resist horizontal and/or vertical movement of horizontally-extending tubular mesh socks that are filled with and/or contain plant growing medium. For example, the trays can extend horizontally and/or parallel to a longitudinal axis of the socks such that gravity keeps the socks in the trays.

Figure 5:
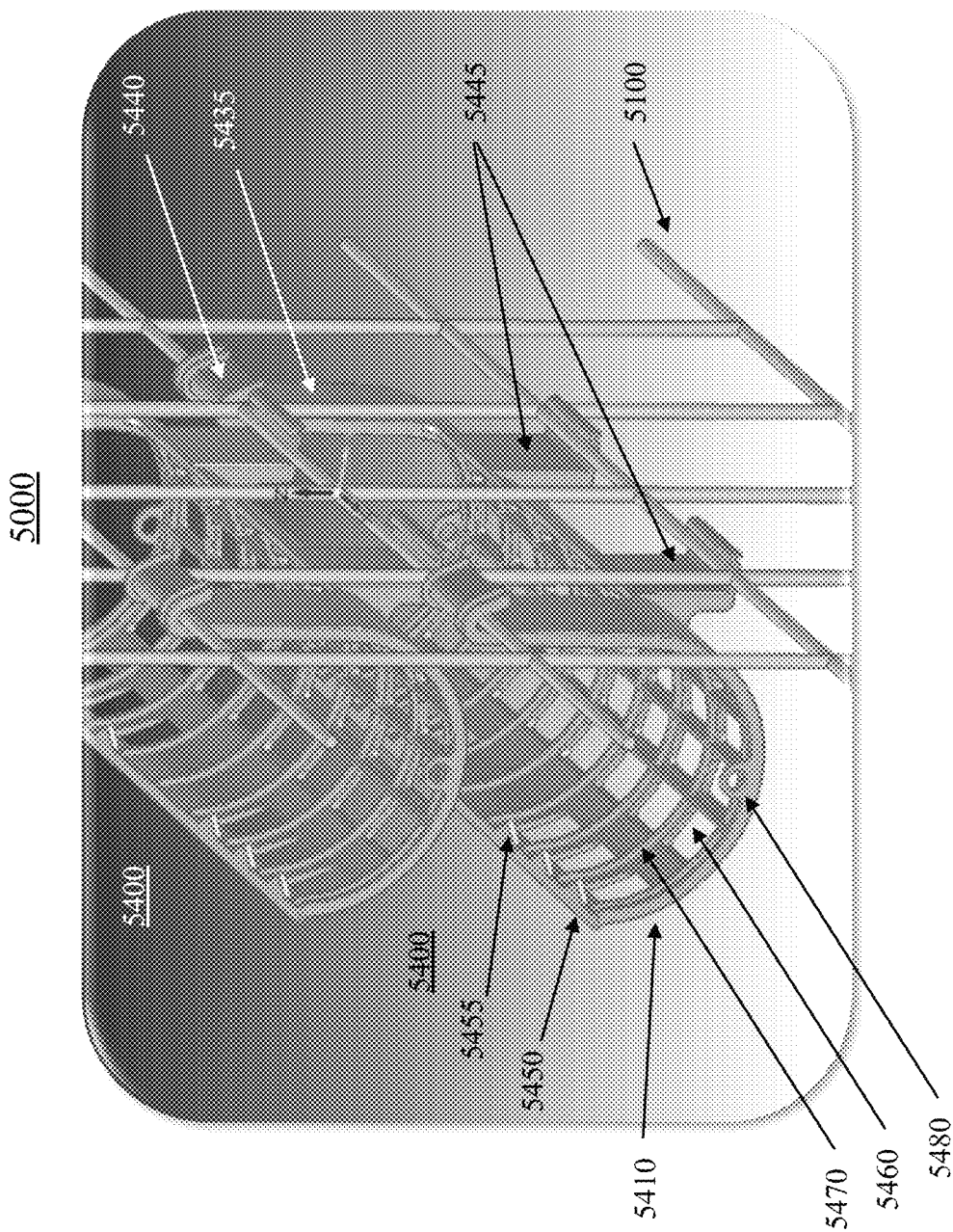
FIG. 5 is a perspective view of an exemplary embodiment of a system.
Figure 6:
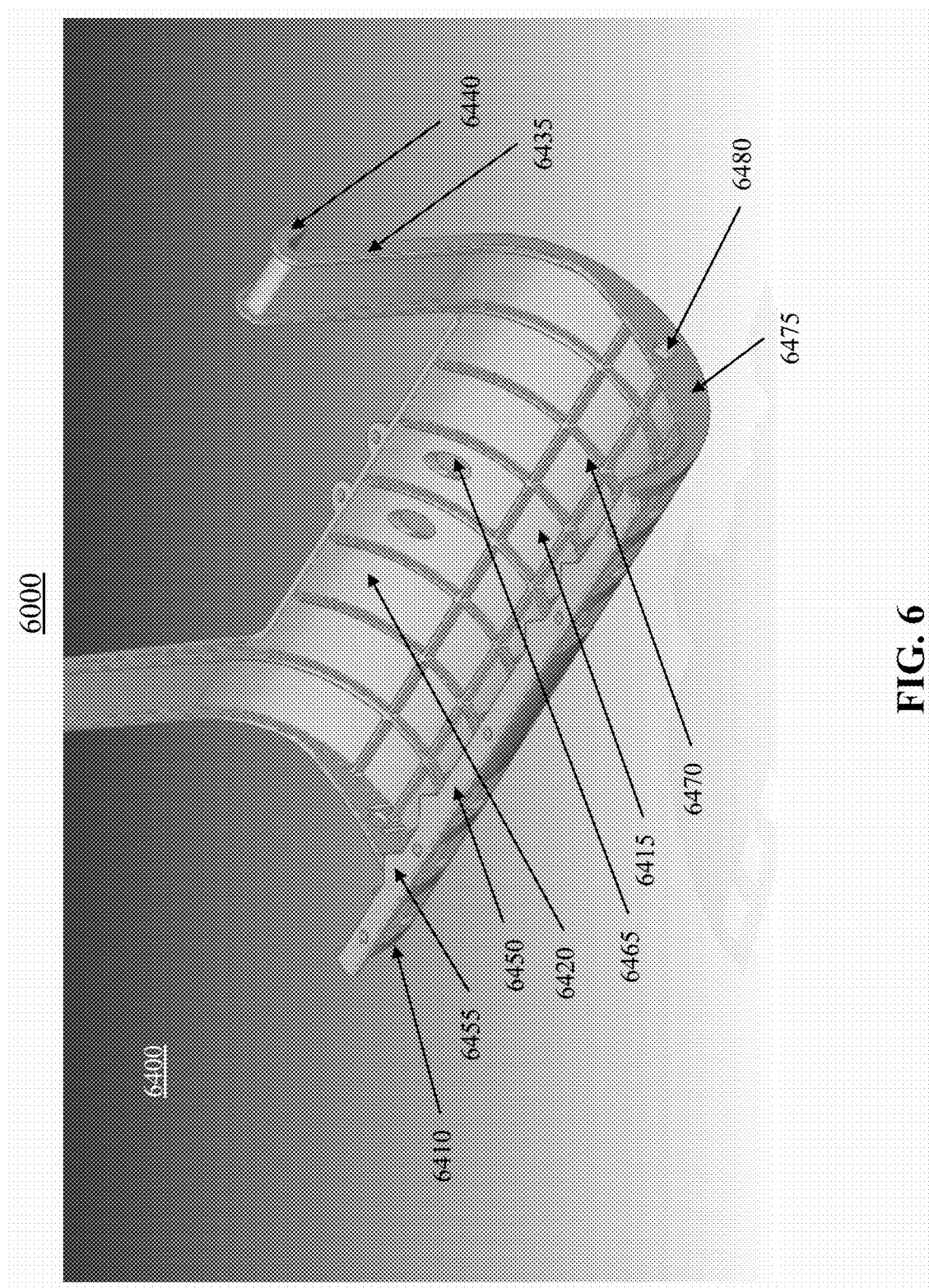
FIG. 6 is a perspective view of an exemplary embodiment of a tray.
Figure 8:
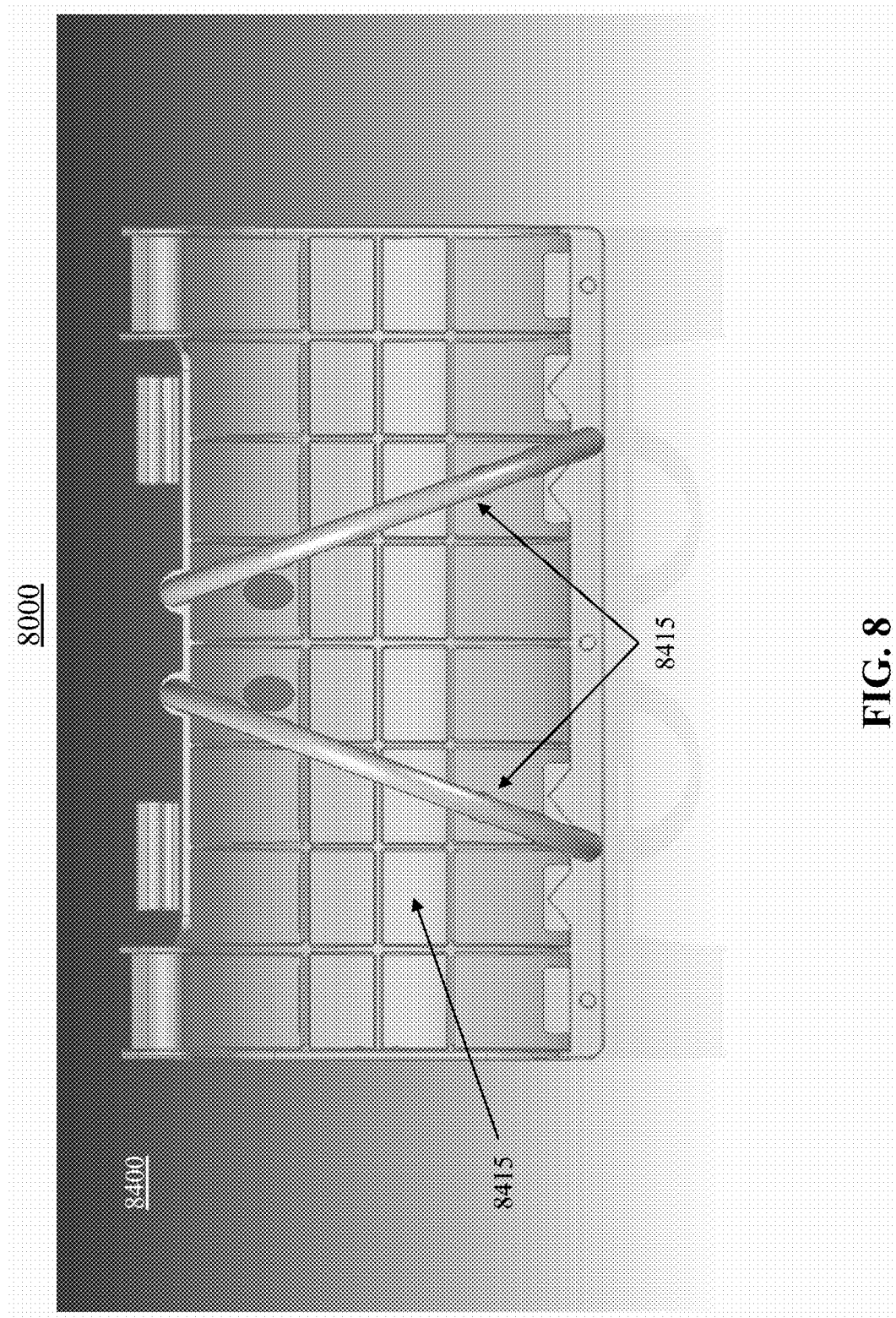
FIG. 8 is a top view of an exemplary embodiment of a tray.

As another example, the trough-like trays can define one or more integral "teeth" that tend to resist removal of the socks once they have been placed in their corresponding tray(s), those teeth potentially extending toward the sock from the tray wall and/or one or more tray ribs, ledges or lips (where the tray wall ends its semi-circular shape), and/or tray edge (the innermost portion of the tray lip) (see, e.g., FIGS. 5, 6, and 8, and items P17 and P42 in the incorporated 097 Provisional, etc.). Once installed, if movement of the sock in a longitudinal direction is attempted, the teeth can contact, catch on, and/or penetrate the fabric of the sock, thereby resisting that longitudinal movement.

As another example, a sock can be secured to a corresponding tray via a restrainer, such as a wire tie, zip-tie, cable, rope, elastic cord, etc., that extends partially and/or completely around the sock, such as at roughly a midpoint of the length of the sock, the restrainer passing through one or more holes or other apertures formed in the tray (e.g., wall and/or lip) and/or one or more holes or other apertures in the green wall securement. The restrainer need not extend perpendicular to the longitudinal axis of the sock and/or tray, but instead can extend thereto from approximately 20 degrees to 90 degrees, including every value and sub-range within that range.

Figure 7:
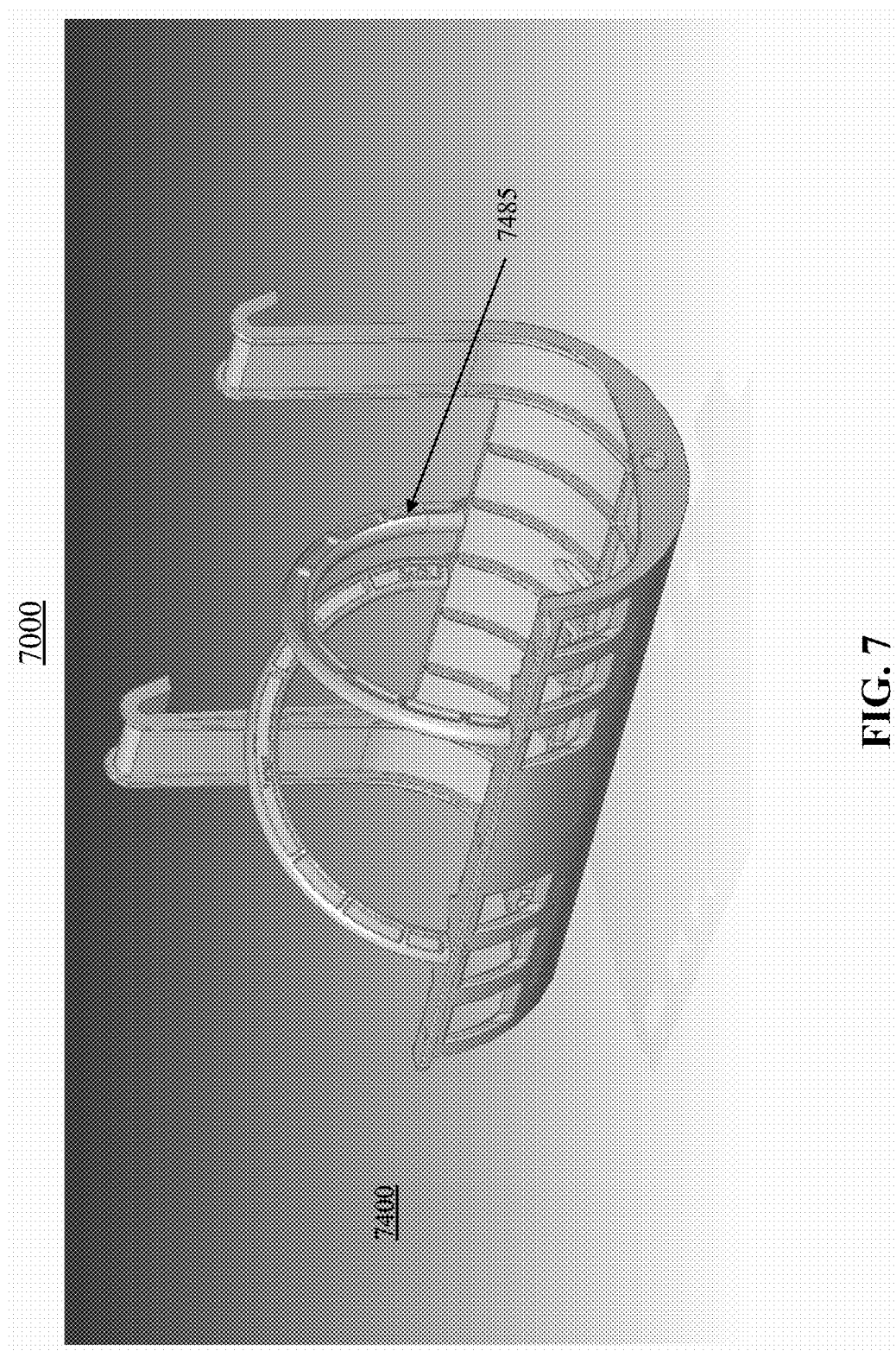
FIG. 7 is a perspective view of an exemplary embodiment of a tray.

As yet another example, the restrainer can be a removable, reusable, replaceable, and/or semi-circularly arched brace member (e.g., a half hoop) that extends from the front lip and/or edge of the tray to the back lip and/or edge of the tray, yet over the sock, thereby trapping the sock in the tray (see, e.g., FIGS. 7 and 8, and items P40, P63, and P67 in the incorporated 097 Provisional, etc.). One end of the brace can be integral to a lip, wall, and/or top edge(s) of the tray. The brace can be attached to a lip, wall, and/or edge(s) of the tray, such as by inserting the brace into an aperture in (or extending from) the tray, and/or by inserting a protrusion extending from the lip, wall, and/or edge(s) of the tray into an aperture of the brace. The aperture can interface with the brace in a loose arrangement and/or a locking arrangement, such as a friction fit, trapped fit, spring-fit, and/or partial-turn locking arrangement, etc. When the partial-turn locking arrangement is used at each end of the brace (see, e.g., FIGS. 7, 8, and 9, and items P41, P43, P64, P65, and P66 in the incorporated 097 Provisional, etc.), the locks and/or keys need not be parallel, but instead can be at any desired angle to one another. Any implementation of the restrainer can serve to maintain alignment of the front lip of the tray and/or to prevent the tray from opening wider than necessary to accommodate the outer diameter of the sock.

The restrainer can be secured to the green wall securement. The restrainer can prevent forward deflection of the tray and/or sock over time, such as might be caused by one or more forces related to climate change, differential thermal expansion, freezing, snow and/or ice load, age, weight of the sock, fatigue, creep, plastic flow, vandalism, etc.

The front of the tray can have a height ranging from approximately 4 inches to approximately 12 inches (including all values and sub-ranges therebetween), a width ranging from approximately 12 inches to approximately 48 inches (including all values and sub-ranges therebetween) and/or a weight ranging from approximately 0.5 pounds to approximately 10 pounds (including all values and sub-ranges therebetween) without socks installed. The back of the tray can have a height ranging from approximately 8 inches to approximately 24 inches (including all values and sub-ranges therebetween). Thus, the size and/or weight of the trays can facilitate easy and/or safe manual handling and/or installation. The distance from the bottom of a given course of trays to the bottom of the next course of trays can be sufficient to accommodate the sock of the given course, and potentially can allow for plants to grow vertically upwards for any desired height from the given course. Thus, the trays can be closely vertically spaced or liberally vertically spaced (e.g., providing clearance from the top of the sock of a given course to the bottom of the tray of the immediately above course of from approximately 0.25 inches to approximately 12 inches (including each and every value and subrange within that range)).

The trays can be vertically arranged to form columns (see, e.g., FIG. 3, and items P15 and P24 in the incorporated 097 Provisional, etc.), can be horizontally offset a predetermined amount with respect to a lower course and/or reference (see, e.g., FIGS. P58, P59, etc.), and/or can be horizontally offset a random amount with respect to a lower course and/or reference.

Figure 3:
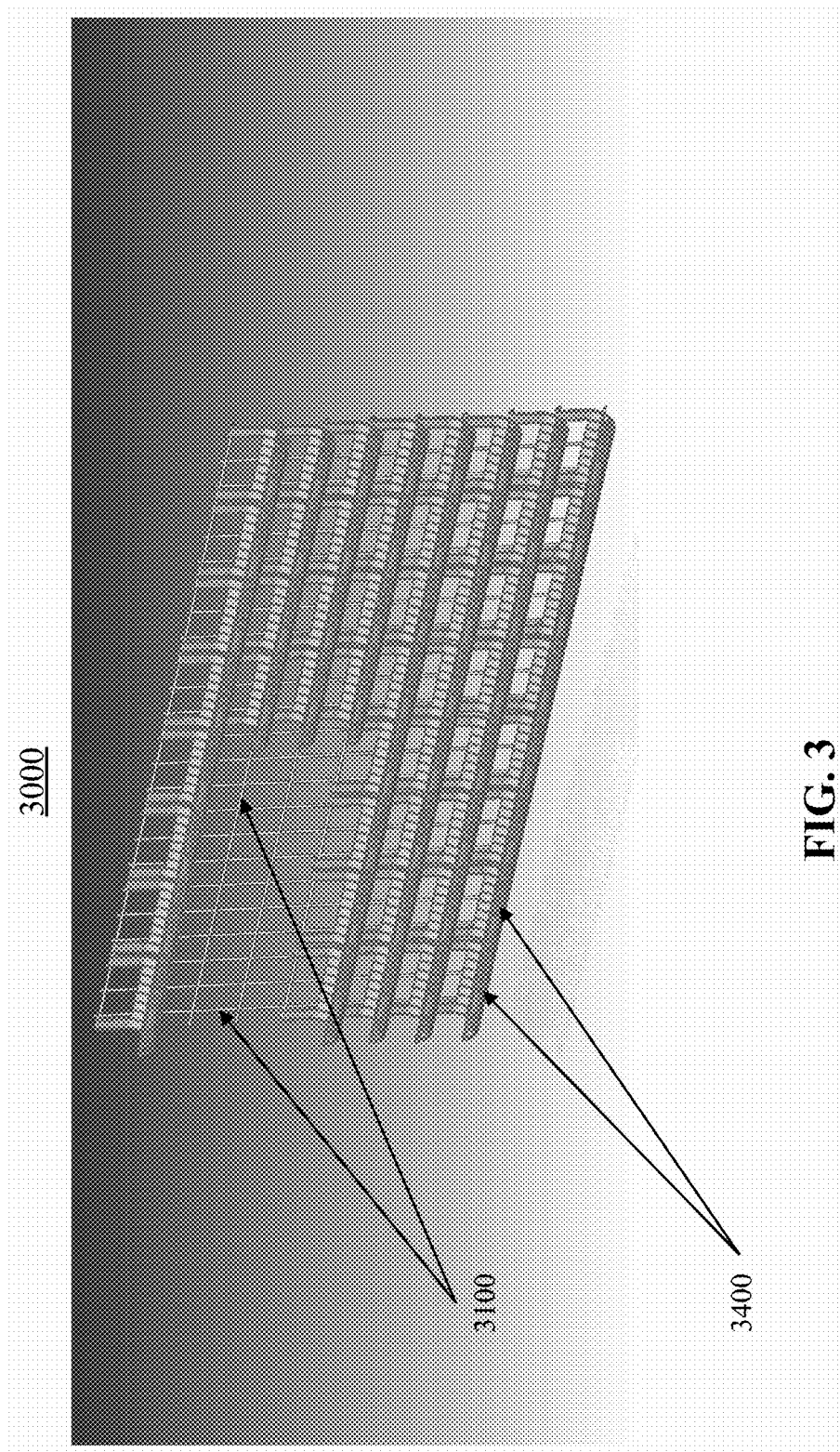
FIG. 3 is a perspective view of an exemplary embodiment of a system.
Figure 4:
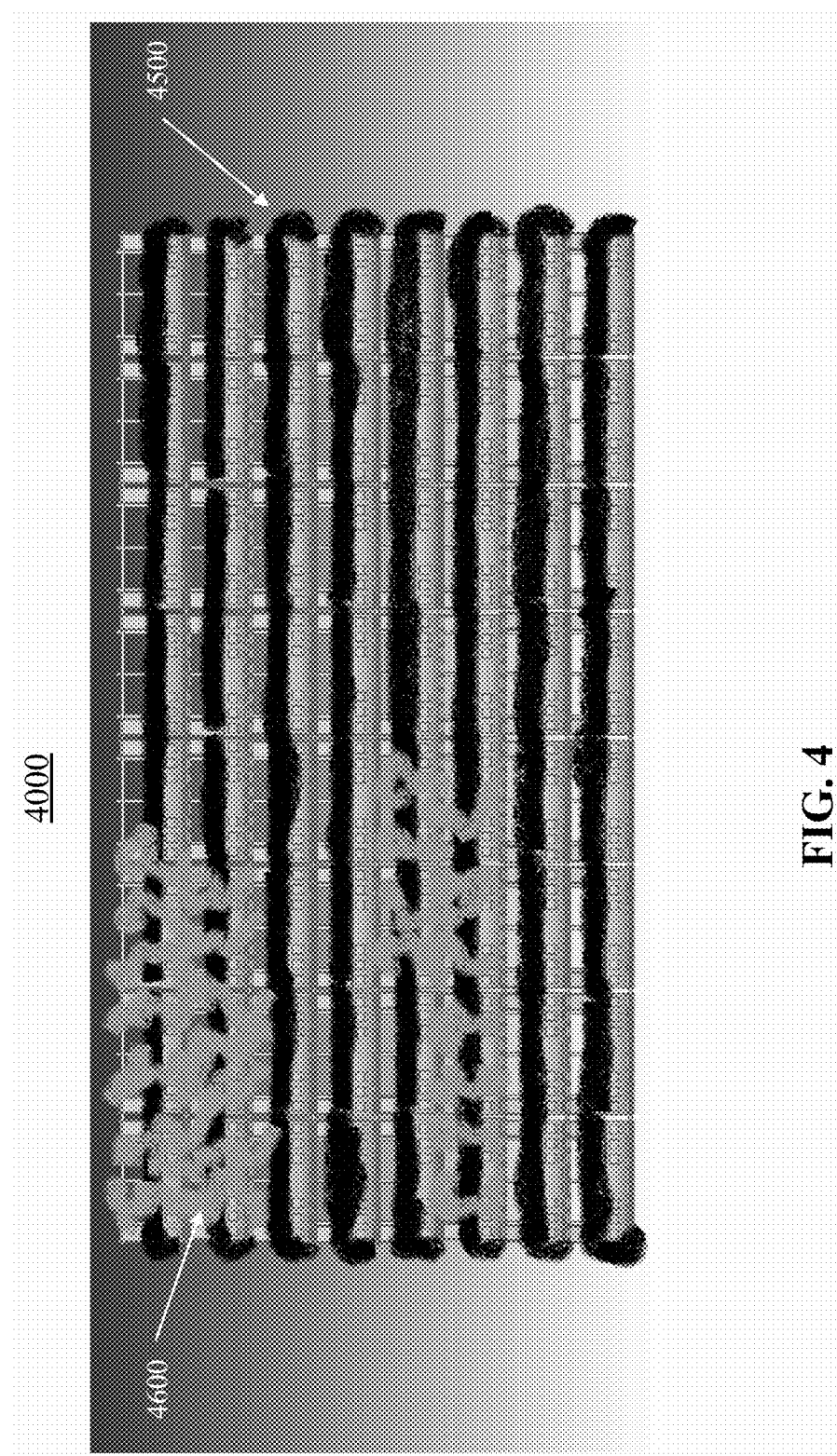
FIG. 4 is a front view of an exemplary embodiment of a system.

A group of trays can be horizontally arranged so that each tray abuts, is closely bordered by, or even connected to, a neighboring tray, so that each sock is supported throughout its length (see, e.g., FIGS. 2, 3, and 4, and items P16, P24, and P30 in the incorporated 097 Provisional, etc.). The trays can be horizontally arranged to border a desired tray with one or more open, tray-less growing zones (that zone filled by one or more socks) (see, e.g., FIG. 2, and items P15 and P27 in the incorporated 097 Provisional, etc.), such as in a running bond manner, so that the tray is horizontally neighbored on at least one end by a growing zone, and a growing zone is horizontally neighbored on at least one end by a tray.

A given course can present alternating trays and growing zones, such that a group of such courses can be offset from the below and/or above course to thereby resemble a checker board, skewed checker board, otherwise patterned, or even random pattern of trays and growing zones. The socks that form the growing zones can extend across and/or beyond a given growing zone and into and/or across a neighboring tray. A single sock can extend across multiple trays to form multiple growing zones. Because in certain embodiments a filled sock can be flexible, a sock can curve to match the contour of the securement, such as if the securement forms a corner. Thus, a sock can span across two trays whose longitudinal axes are not aligned and/or are not parallel, such as when they extend horizontally perpendicularly to one another.

Any tray can be shaped in a manner that allows one tray to nest within another, thereby allowing the trays to be closely grouped to minimize shipping and/or handling volume and/or costs. Any green wall securement, attachment, and/or tray can be formed from metal, such as galvanized steel. Any green wall securement, tray, sock, and/or attachment can be formed from plastic, such as medium to high density polyethylene, polypropylene, polyester, nylon, and/or ABS, etc. Any green wall securement, tray, sock, and/or attachment can be formed from recycled plastic. Any green wall assembly can be formed and/or totally from recycled and/or post-consumer content, particularly if the socks are filled with compost.

Because, in certain exemplary embodiments, a tray can resemble a lattice, mesh, and/or holed curved plate (see, e.g., FIGS. 1 and 5, and items P13 and P69 in the incorporated 097 Provisional, etc.), such that any portion of the exposed surface of the corresponding sock(s) can be planted and/or serve as a plant growing zone. Because, in certain exemplary embodiments, the bottom-most portion of a tray can resemble a lattice, mesh, and/or holed curved plate, roots of plants can extend through the corresponding sock(s) and further down into and/or around the lower courses of a green wall and/or into a soil substrate below the green wall, thereby creating a structural web of roots that can further secure and/or stabilize the green wall. Because, in certain exemplary embodiments, the bottom-most portion of a tray can be solid (see, e.g., FIGS. 6, 7, and 8, and items P38 and P44 in the incorporated 097 Provisional, etc.), roots of plants can be substantially prevented from extending below the tray, thereby allowing the corresponding sock(s) (and plants growing therein) to be relatively easily removed from the tray, potentially even when its plants are substantially, firmly, and/or thoroughly established in the sock(s). With this approach, plant-bearing socks can be rotated in and out of a given location on a wall. Because, in certain exemplary embodiments, ribs can extend across the bottom-most portion of a tray (see, e.g., FIGS. 6, 7, and 8, and items P41, P42, and P59 in the incorporated 097 Provisional, etc.), water can be trapped in the tray, the depth of the water sufficient to irrigate the bottom of the corresponding sock(s) and/or the root zone of plants growing in that sock(s), the depth of the water retained by the ribs within a range of 0.125 inches to approximately 2 inches (including each and every value and sub-range within that range).

Any sock and/or the growing medium it contains can have any of the characteristics described herein. Any sock can have a length of from approximately 1 foot to approximately 6 feet (including each and every value and sub-range within that range) when supplied as "short socks" and a length of from approximately 4 feet to approximately 10,000 feet (including each and every value and sub-range within that range) when supplied as a "continuous sock". Any sock can have a diameter of from approximately 6 inches to approximately 24 inches (including each and every value and sub-range within that range). Any sock can rest in the extended trough-like portion of the tray.

Any plant growing medium can be GrowingMedia™ (from Filtrexx of Akron, Ohio), can be a Filtrexx certified growing medium, and/or can include compost, composted organic materials, organic feedstocks, composted products, mulch, wood shavings, alum, lime, clay, pea gravel, gravel, sand, soil, wood chips, bark, peat, soil blends, straw, hay, leaves, sawdust, paper mill residuals, wood wastes, wood pellets, hemp, bamboo, biosolids, coconut fibers, coir, wheat straw, rice straw, rice hulls, oat straw, soybean hulls, palm wastes, palm leaves, agricultural waste products, manure, wool, hair, sugar cane bagasse, seed hulls, jute, flax, hulls, organic waste, cat litter, plant seeds, plugs, sprigs, and/or spores, etc.

If a compost is provided, it can provide treatment of water entering and/or exiting the sock, such as runoff and/or stormwater, by physically straining that water; biologically degrading unwanted, harmful, and/or polluting substances; and/or chemically binding certain pollutants, such as metals (e.g., arsenic, cadmium, chromium, cobalt, copper, lead, mercury, nickel, and/or selenium), hydrocarbons and/or organic chemicals (such as 2,4,6-trinitrotoluene), and/or nutrients (such as fertilizer, nitrates, phosphates, sewage, and/or animal waste).

If a compost is provided, it can be weed seed-free, disease-free, and/or insect-free, and/or can be derived from a well-decomposed source of organic matter. Certain embodiments of such compost can be free of refuse, contaminants, and/or other materials toxic and/or deleterious to plant growth. In certain embodiments, the compost can have a pH that measures anywhere between approximately 5.0 and approximately 8.0 (including each and every value and sub-range within that range). Certain embodiments of such compost can be produced according to an aerobic composting process meeting 40 CFR 503 regulations. Certain embodiments of such compost can have a moisture content of less than 60%. In certain embodiments, the particle size of the compost can conform to the following: approximately 99% passing a 1 inch sieve, approximately 90% passing a 0.75 inch sieve, a minimum of 70% greater than an approximately 0.375 inch sieve, and/or less than 2% exceeding approximately 3 inches in length. In certain embodiments, the minimum particle size can be eliminated, thereby effectively ensuring that some fines will remain that can help vegetation become established.

Certain embodiments of such compost, such as those used for sediment control, can contain less than 1% by dry weight of inert, foreign, and/or man-made materials. Certain embodiments of such compost can have predetermined materials added thereto.

For example, certain embodiments of the filling can include, support, and/or encompass one or more microorganisms, microflora, rhizospheres, mycospheres, and/or ecosystems that can biologically and/or chemically break-down, decompose, degrade, bind, and/or filter unwanted pollutants in the water that flows therethrough.

Certain embodiments of the filling can include entities such as colonies, spores, seeds, bulbs, plugs, sprouts, sprigs, and/or seedlings of microorganisms, bacteria, fungi, and/or plants. As these entities become established, these entities can provide numerous beneficial functions.

For example, certain living entities can assist with remediating the environmental impact of the expected effluent. For example, plants commonly called cattails, reeds, rushes and/or skunk cabbage can be useful for treating certain types of sewage. Thus, for example, a potential wetland area and/or slope downstream of a septic field can be faced, surrounded, and/or filled with a filled socks seeded with an appropriate variety of plant.

As another example, certain plants, such as mustard, can be useful for absorbing particular heavy metals. As yet another example, the root systems of plants growing from a filled sock can serve to anchor the filled sock into the adjacent soil. This anchoring can serve to prevent run-off from moving or washing away the filled sock.

As a further example, certain embodiments of the filled sock can eventually provide plants can improve the aesthetic image of the filled sock. Thus, rather than permanently presenting a black, brown, or gray-colored compost-filled sock, a sprouted filled sock can present, for example, blooming flowers, groundcovers, vines, shrubs, grasses (such as turn seed, annual rye, crown vetch, birds foot trefoil, and/or fescues), and/or aquatic plants, etc.

As another example, via a technique called myco-remediation, certain fungi and/or fungal components, such as macrofungi (including mushrooms commonly referred to as shiitakes, portabellas, criminis, oysters, whites, and/or morels), white-rot fungi (such as P. chrysosporium), brown-rot fungi, mycelium, mycelial hyphae, and/or conidia, can be included within the growing medium and/or the sock for decomposing and/or breaking down pollutants and/or contaminants, including petroleum, fertilizers, pesticides, explosives, and/or a wide assortment of agricultural, medical, and/or industrial wastes. Certain of such fungi and/or fungal components are available from Fungi Perfecti of Olympia, Wash.

In certain embodiments, a microbial community encompassed within the filling of the sock can participate with the fungi and/or fungal components to break down certain contaminants to carbon dioxide and water. Certain wood-degrading fungi can be effective in breaking down aromatic pollutants and/or chlorinated compounds. They also can be natural predators and competitors of microorganisms such as bacteria, nematodes, and/or rotifers. Certain strains of fungi have been developed that can detect, attack, destroy, and/or inhibit the growth of particular bacterial contaminants, such as *Escherichia coli* (*E. coli*).

Certain embodiments of the filling can include one or more fertilizers, flocculants, chemical binders, and/or water absorbers, any of which can be selected to address a particular need and/or problem, such as to fertilize the growth of a predetermined plant species and/or to bind a predetermined chemical.

A sock can be obtained pre-filled, such as with a plant growing medium, and/or a filling and/or plant growing medium can be added to a sock on-site and/or in situ. To top-off and/or fill a sock on site and/or in situ, a storage enclosure can at least partially surround a filling (such as a plant growing medium), and can be a vessel, tank, hopper, truck, and/or pile, etc. A filling delivery mechanism can be a hose, tube, pipe, duct, and/or chute, and can include a mechanical and/or pneumatic component, such as an auger, vibrator, and/or fan, etc. for biasing the filling toward and/or into a sock. The delivery mechanism can be replaced with a manual approach, whereby a human places filling into a sock. The delivery mechanism can include a nozzle, reducer, and/or hose adaptor that allows a standard hose (such as a hose having an outer diameter of from approximately 4 inches to approximately 5 inches) to fill a larger and/or smaller diameter sock.

The sock can be fabricated from a flexible netting material, which can be woven, sewn, knitted, welded, molded, and/or extruded, etc. One source of netting material is Tipper Tie-net of West Chicago, Ill. The netting material can be biodegradable, and in certain embodiments, at a predetermined rate of biodegradation. Alternatively, the netting material can resist biodegradation. The netting material can be fabricated from cotton, burlap, hemp, plastic, biodegradable plastic, UV sensitive plastic, UV inhibited plastic, polyester, polypropylene, multi-filament polypropylene, polyethylene, LDPE, HDPE, rayon, and/or nylon.

The netting material can be of any diameter and/or thickness, ranging from approximately 0.5 mils to 30 mils, including each and every value and sub-range within that range, such as approximately 0.5, 0.75, 1, 2, 3, 4, 5, 6, 7, 8, 9, 10, 12, 15, 18, 20, 22, 25, 28, and/or 30 mils (including each and every value and sub-range within those ranges). The netting material can be in any available mesh size (mesh opening), from a mesh as small as that of women's pantyhose, and including a nominal mesh opening of approximately: 0.001, 0.005, 0.010, 0.025, 0.050, 0.0625, 0.125, 0.25, 0.375, 0.5, 0.625, 0.75, 0.875, 1.0, 1.125, 1.25, 1.375, and/or 1.5 inches (including each and every value and sub-range within those ranges). The netting material can have any mesh opening pattern, including diamond, hexagonal, oval, round, and/or square, etc. The sock can be fabricated in standard lengths, such as any of approximately 1, 2, 3, 4, 5, 6, 7, 8, 9, 10, 15, 20, 25, 50, 75, 100, 125, 150, 200, 250, 300, 400, and/or 500 foot lengths (including each and every value and sub-range within those ranges), any of which can be coupled together to form a continuous mesh tube of any size, including tubes as long as 1000, 2000, 3000, 4000, 5000, 7500, and/or 10,000 or more feet (including each and every value and sub-range within those ranges). Thus, certain lengths of filled socks can be intended to be portable, and other lengths of filled socks can be intended to be immobile.

The sock can be filled completely or incompletely. When filled completely, the sock can be generally curvilinear, round, oval, or polygonal in longitudinal cross-section. If generally oval, the sock can have a major diameter ranging from approximately 3 inches to approximately 30 inches, including approximately 3, 4, 5, 6, 8, 10, 12, 14, 16, 18, 20, 22, 24, 26, 28, and/or 30 inches (including each and every value and sub-range within those ranges). Thus, the ratio of the length of the sock to its major diameter can be approximately 5, 6, 7, 8, 9, 10, 15, 20, 25, 30, 35, 40, 45, 50, 75, 100, 150, 200, 300, 400, and/or 500 or larger (including each and every value and sub-range within those ranges).

The sock can have opposing longitudinal ends, the end nearest the delivery device called the proximal end and the end furthest the delivery device called the distal end. The distal end can be closed and/or sealed prior to the delivery of filling into the sock. After delivery of the filling into the sock, the proximal end can be closed and/or sealed. The method of closing and/or sealing either of the ends of the sock can include knitting, sewing, folding, welding, stapling, clipping, clamping, tying, knotting, and/or fastening, etc.

The socks can securely contain the plant growing medium, so that the growing medium does not intermix with the backfill, wash-out and/or erode down the back of the face, and/or wash and/or leach outward onto and/or down the outer face of green wall. The socks likewise can provide a barrier to prevent the backfill from washing and/or leaching outward onto and/or down the outer face of green wall. Due to the containment of the growing medium, the plants can be provided access to a predetermined, known, and/or continuous quantity and/or quality of growing medium, which can lead to the growth of an inter-connected mass of plant roots that can further stabilize the green wall.

Via certain exemplary embodiments, fluidic irrigation conduits, such as pipes, tubing, and/or hose, can be installed longitudinally externally between and/or longitudinally internally through or adjacent to the socks, thereby allowing for timed and/or controlled amounts of water to be applied as desired at predetermined courses and/or locations within the green wall assembly and/or for drip irrigation, thus allowing for the plants to be adequately watered to sustain their growth and/or vitality (see, e.g., FIGS. 12A and 12B, and items P48, P58, and P60 in the incorporated 097 Provisional, etc.). One or more predetermined fertilizers, pesticides, and/or other plant-enhancing compositions can be added to the irrigation water as desired to further sustain plant growth and/or vitality.

The trays can comprise a integral and/or removable restrainer that can surround and/or connect to a portion of the irrigation conduit and/or can restrain and/or resist non-longitudinal movement of the irrigation conduit (see, e.g., FIGS. 5 and 6, and items P68 and P69 in the incorporated 097 Provisional, etc.). In certain exemplary embodiments, the restrainer can resemble a grommet and/or a ring-like structure that is molded integrally with one or both ends of the tray, the inner diameter of the ring slightly larger than the outer diameter of the conduit, the height of the center of the ring configured to locate the conduit adjacent to the sock or within the sock, such as potentially concentric and/or parallel with the longitudinal axis of the sock.

FIG. 1 is a front view of an exemplary embodiment of a system 1000, which can include a wire mesh securement 1100 that is coupled via an attachment 1200 to a structure 1300, and supports a tray 1400 that is configured to support a sock.

FIG. 2 is a perspective view of an exemplary embodiment of a tray 2400.

FIG. 3 is a perspective view of an exemplary embodiment of a system 3000 that can include a plurality of securements 2100 that can support a plurality of trays 3400.

FIG. 4 is a front view of an exemplary embodiment of a system 4000 that can include a green wall formed from a plurality of securements that support a plurality of trays, the trays supporting a plurality of socks 4500 that contain growing media for plants 4600.

FIG. 5 is a perspective view of an exemplary embodiment of a system 5000, which can include a securement 5100 that supports multiple trays 5400. Any tray can define a front 5410, a bottom and/or a back. Tray 5400 can include a riser 5435 that can terminate with a hanger 5440 for supporting tray 5400 from securement 5100. Tray 5400 can include one or more feet 5445 that can snap on to securement 5100. Tray 5400 can include a front lip 5450 to which can be attached one or more teeth 5455 that can resist horizontal and/or vertical movement of a sock supported by tray 5400. Tray 5400 can define one or more apertures 5460 and/or ribs 5470. Tray 5400 can define one or more grommets 5480 that can guide an irrigation conduit.

FIG. 6 is a perspective view of an exemplary embodiment of a system 6000, which can include a tray 6400, which can define a tray front 6410, tray bottom 6415, tray back 6420, tray end 6475, riser 6435, hanger 6440, edge 6450, teeth 6455, drain holes 6465, ribs 6470, and/or grommets and/or irrigation conduit apertures 6480.

FIG. 7 is a perspective view of an exemplary embodiment of a system 7000, which can include a tray 7400, which can include and/or couple to one or more braces 7485.

FIG. 8 is a top view of an exemplary embodiment of a system 8000, which can include a tray 8400, which can have a substantially solid bottom 8415 and/or one or more braces 8485 that can restrain a sock within tray 8400.

Figure 9:
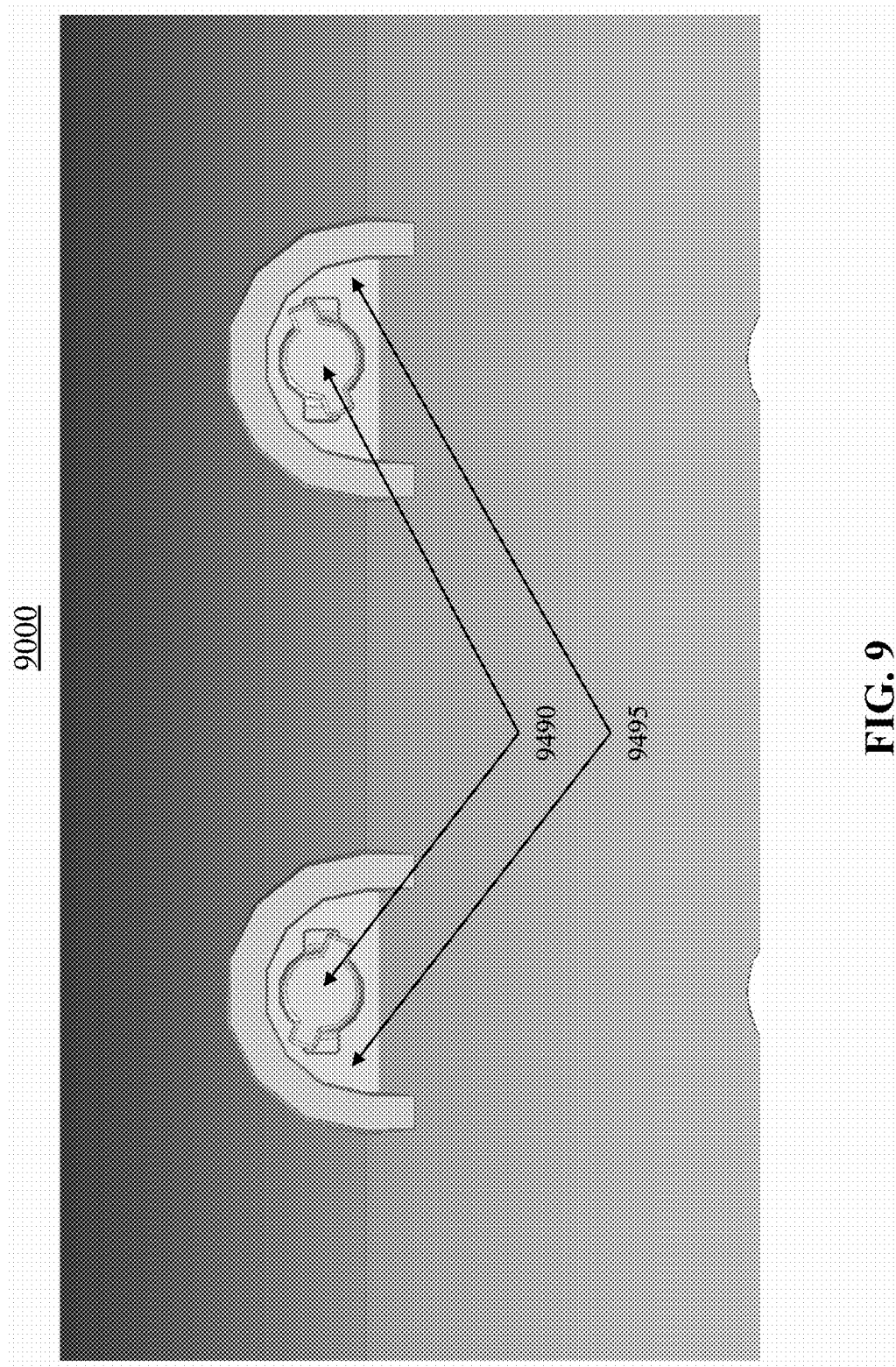
FIG. 9 is an end view of an exemplary embodiment of a brace locking arrangement.

FIG. 9 is an end view of an exemplary embodiment of a brace locking arrangement 9000, which can include one or more brace ends 9490 and/or one or more brace holes 9495.

Figure 10:
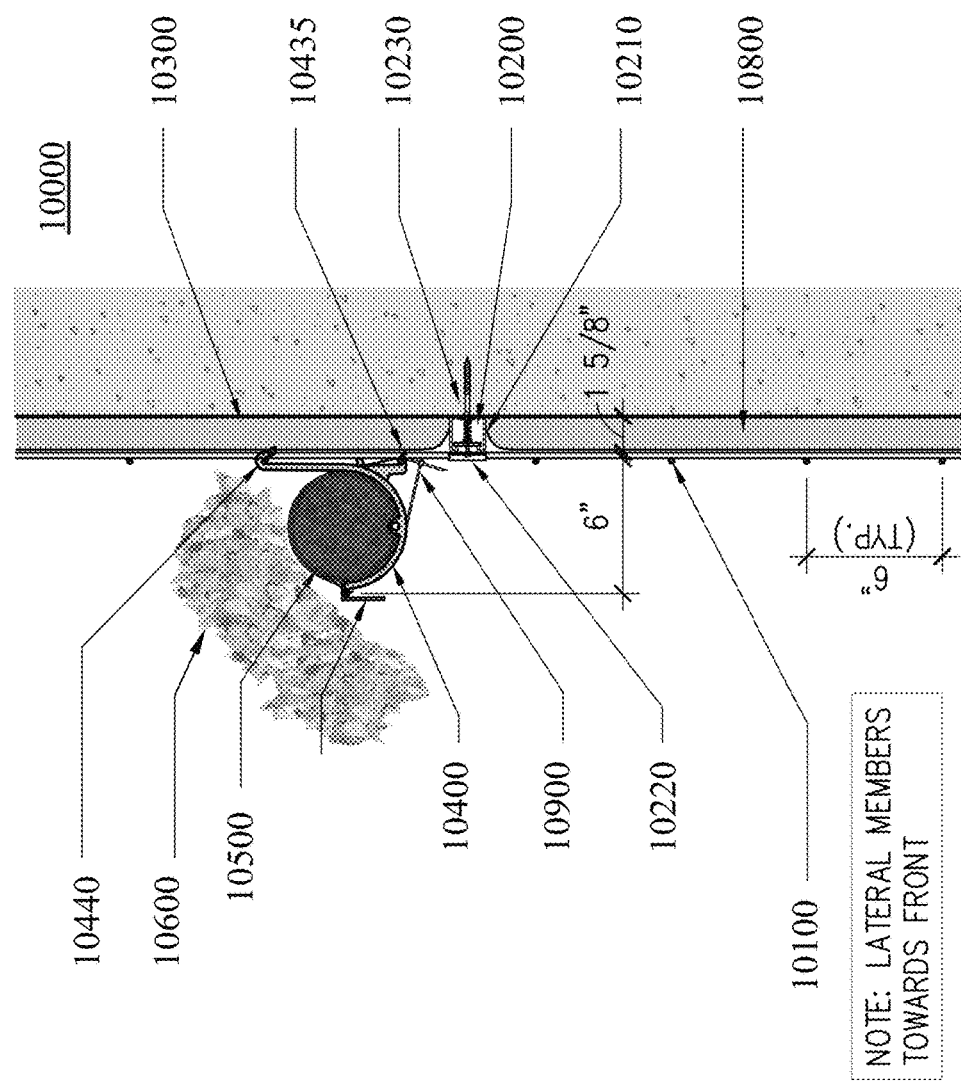
FIG. 10 is a side view of an exemplary embodiment of a system.

FIG. 10 is a side view of an exemplary embodiment of a system 10000, which can include a securement 10100 coupled to a structure 10300 via an attachment 10200, which can include a channel 10210, securement clamp 10220, and/or fastener 12230. Attachment 10200 can offset securement 10100 from structure 10300 and thereby create a gap that can be substantially filled by a buffer 10800. Securement 10100 can support hanger 10440 of a tray 10400, which can structurally support a filled sock 10500 that is filled with a growing medium suitable for growing plants 10600. Tray 10400 can be fastened to securement 10100 via a fastener 10900, such as a zip tie.

FIG. 11 is a side view of an exemplary embodiment of a system 11000, which can include a free-standing structure 11300, having one or more uprights 11320 and/or one or more structure feet 11340. Attached to structure 11300 via attachments 11200 can be one or more securements 11100, which can support one or more trays 11400, which can include and/or one or more risers 11435 and/or one or more feet 11445. Tray 11400 can support one or more socks 11500 from which plants can grow.

FIG. 12A is a side view, and FIG. 12B is a front view, of an exemplary embodiment of a system 12000, which can include a structure 12100, an irrigation supply line 12710, an irrigation emitter line 12720, and/or an irrigation line fastener 12730 that can attach irrigation supply line 12710 and/or irrigation emitter line 12720 to structure 12100.

Certain exemplary embodiments of the herein described structure covering system can:
- be built without using filter cloth for backfill separation;
- provide for precise placement of growth medium;
- utilize a precise quantity of growth medium;
- offer a precise quality of growth medium;
- include built-in erosion control; and/or
- allow seed mix to be placed inside the sock to eliminate the need to hydro seed after completion.

Certain exemplary embodiments can provide a support system for a green wall, the support system comprising:
- a plurality of elongate tubular mesh socks, the socks containing plant growing medium, the socks configured to prevent erosion and loss of the plant growing medium, the socks arranged to define a stacked plurality of horizontally-extending courses;
a plurality of elongate trough-like trays that support the socks, resist vertical movement of the socks, and resist horizontal movement of the socks, a predetermined tray from the plurality of trays defining a longitudinal axis that extends parallel to a longitudinal axis of a corresponding sock from the plurality of socks, the corresponding sock installed in the predetermined tray;
a securement system to which each of the trays are securely, yet non-destructively removeably attached via one or more corresponding tray support members, the securement system comprising one or more wire mesh panels that extends in a vertical plane and is offset-mounted to a vertically extending wall;
a plurality of restrainers, each configured to secure a corresponding sock from the plurality of socks to a corresponding tray from the plurality of trays and/or to the securement system; and/or
an irrigation conduit that is secured by one or more trays from the plurality of trays and extends parallel to a selected course of the stacked plurality of horizontally-extending courses.

Certain exemplary embodiments can provide a support system for a green wall, the support system comprising:
a plurality of elongate trough-like trays,
the securement system;
the plurality of socks;
the irrigation conduit; and/or
a restrainer configured to secure a sock to a tray and/or the securement system;
wherein:
   the trays are configured to securely, yet non-destructively removeably, attach to a securement system;
   the trays are configured to resist vertical movement of a plurality of elongate tubular mesh socks once the socks are installed in the trays, the socks containing plant growing medium, the socks configured to prevent erosion and loss of the plant growing medium, the socks arranged to define a stacked plurality of horizontally-extending courses;
   the trays are configured to resist horizontal movement of the socks once the socks are installed in the trays;
   the trays are configured to secure an irrigation conduit that extends parallel to a selected course of the stacked plurality of horizontally-extending courses;
   beach tray is configured to be located horizontally and/or vertically adjacent to one or more growing zones, each growing zone defined by one or more socks, each growing zone not occupied by a tray;
   each tray defines a longitudinal axis that is configured to extend parallel to a longitudinal axis of a sock installed in that tray;
   one or more of the trays comprises a solid tray bottom;
   one or more of the trays defines a plurality of solid tray bottom portions;
   one or more of the trays comprises a latticed tray bottom;
   one or more of the trays is semi-circular in longitudinal cross-section;
   one or more of the trays is configured to non-destructively releaseably lockably attach to the securement system;
   one or more of the trays comprises one or more tray support members that is configured to be supported by the securement system;
   one or more of the trays comprises one or more downward-opening hook-shaped tray hangers that is configured to be supported by a horizontally-extending elongate member of the securement system;
   one or more of the trays comprises one or more tray securement members that is configured to securely, yet non-destructively removeably, attach to the securement system;
   one or more of the trays comprises one or more upward-opening hook-shaped tray securement members that is configured to securely, yet non-destructively removeably, attach to a horizontally-extending elongate member of the securement system;
   one or more of the trays is configured to support one or more socks;
   one or more of the trays comprises an apertured portion;
   one or more of the trays is configured to allow plant roots to extend downwards from the sock;
   the system is configured to provide an exposed face for the green wall that is plantable to form a completely vegetated living wall;
   the securement system comprises one or more wire mesh panels;
   the securement system comprises one or more wire mesh panels that extends in a vertical plane;
   the securement system comprises one or more wire mesh panels that extends in a vertical plane and is offset-mounted to a vertically extending wall;
   the securement system comprises one or more wire mesh panels that extends in a vertical plane and is mounted to a vertically extending wall, the panels separated from the wall by a buffer material;
   the securement system comprises one or more wire mesh panels that extends in a vertical plane and is mounted to a vertically extending wall, the panels separated from the wall by a buffer material configured to absorb sound that would otherwise penetrate the wall;
   the securement system comprises one or more wire mesh panels that extends in a vertical plane and is mounted to a vertically extending wall, the panels separated from the wall by a buffer material configured to impede heat transfer through the wall;
   the securement system comprises one or more wire mesh panels that extends in a vertical plane and is mounted to a vertically extending wall, the panels separated from the wall by a buffer material configured to deter combustion of the wall despite combustion of one or more of the trays;
   the securement system comprises one or more wire mesh panels that comprise one or more horizontally-extending elongate members;
   the securement system is configured to attach to a load-bearing member of an existing structure via one or more attachments;

Certain exemplary embodiments can provide a method comprising:
stacking courses of horizontally-extending tubular mesh socks filled with plant growing medium, the socks secured to a green wall securement by trough-like trays that securely, yet non-destructively removeably, attach to the green wall securement;
wherein:
   the socks are configured to contain the plant growing medium and to prevent erosion and loss of the plant growing medium;

the trays are configured to resist vertical movement of the socks once the socks are installed in the trays;

the trays are configured to resist horizontal movement of the socks once the socks are installed in the trays;

the trays are configured to secure an irrigation conduit that extends parallel to a selected course of the courses;

the irrigation conduit extends through an aperture of one of the trays;

the irrigation conduit extends through at least one of the socks; and/or the trays are configured to retain irrigation water.

Certain exemplary embodiments can provide a method comprising:

supporting each of a plurality of horizontally-extending tubular mesh socks via a corresponding trough-like tray from a plurality of trays, the trays arranged to define a plurality of horizontally-extending courses, each tray configured to securely attach to a green wall securement, each sock containing plant growing medium, the socks configured to prevent erosion and loss of a plant growing medium, the trays configured to resist vertical movement of the socks once the socks are installed in the trays, the trays configured to resist horizontal movement of the socks once the socks are installed in the trays, and the trays configured to secure an irrigation conduit that extends parallel to a selected course of the courses;

wherein:

the irrigation conduit extends through an aperture of one of the trays;

the irrigation conduit extends through at least one of the socks; and/or the trays are configured to retain irrigation water.

Definitions

When the following terms are used substantively herein, the accompanying definitions apply. These terms and definitions are presented without prejudice, and, consistent with the application, the right to redefine these terms via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.

absorb—to take in without substantial echo, recoil, and/or reflection.

activity—an action, act, step, and/or process or portion thereof.

adapted to—made to, designed to, and/or configured to perform a specified function.

adapter—a device used to effect operative compatibility between different parts of one or more pieces of an apparatus or system.

adjacent—close to; lying near; next to; adjoining, and/or within a radius of approximately 0.1 inches to approximately 6 inches of, including all values and subranges within that range.

aesthetic—attractive, elegant, and/or tasteful.

allow—to provide, let do, happen, and/or permit.

alternate—to occur, happen, present, and/or follow in turns and/or succeeding each other continuously.

an—at least one.

and—in conjunction with.

and/or—either in conjunction with or in alternative to.

aperture—an opening, hole, gap, passage, and/or slit.

apparatus—an appliance and/or device for a particular purpose.

approximately—as would be understood by a person having ordinary skill in the art of the claimed subject matter: close to, around, by and large, roughly, and/or in the region of; and if not understood by a person having ordinary skill in the art, then deviating from by no more than ten percent (10%) from absolute.

are—to exist.

arrange—to dispose in a particular order.

associate—to join, connect together, accompany, and/or relate.

at—in, on, and/or near.

at least—not less than, and possibly more than.

attach—to substantially: join; connect; link; secure; and/or fasten together.

attachment—something that attaches one thing to another, such as a fastener and/or tie.

axis—a straight line about which a body and/or geometric object rotates and/or can be conceived to rotate and/or a center line to which parts of a structure and/or body can be referred.

back—a part and/or area opposite, behind, and/or farthest from the front and/or from that which is configured for view and/or use.

backfill—(n) material used for refilling an excavation and/or extending an earthen elevation and/or mound; (v) to refill an excavation using such material and/or extend an earthen elevation and/or mound using such material.

basket—a mesh and/or interwoven container.

batter—a generally upwardly receding slope and/or the angle of that slope.

be—to exist in actuality.

bear—to hold up and/or support.

behind—substantially: on the farther side of; rearward of; and/or in, to, or toward the rear.

bend—to cause to assume a curved or angular shape, and/or a result thereof.

between—in a separating interval and/or intermediate to.

block-like—generally geometrically, functionally, and/or structurally resembling a block and/or extruded rectangular shape, such as a stone and/or concrete block.

bottom—an approximately deepest and/or lowest part of an object relative to a point of reference, the object in a predetermined orientation relative to the point of reference; below relative to a predetermined orientation of an object; and/or a base and/or supporting part.

buffer—that which protects against, resists, lessons, shields, intercepts, and/or moderates adverse and/or potentially damaging impacts, processes, pressures, circumstances, and/or influences.

build—to make, construct, and/or assemble.

by—via and/or with the use or help of.

can—is capable of, in at least some embodiments.

cause—to generally: bring about; provoke; precipitate; produce; elicit; be the reason for; result in; and/or effect.

combustion—burning and/or the chemical action resulting from the direct combination of oxygen gas, generally in air, with a combustible material accompanied by the evolution of heat and light.

completely—entirely and/or at natural and/or proper stopping point.

comprising—including but not limited to.

concentrate—to substantially: bring and/or draw to a common center; direct toward one point; focus; converge; collect; intensify; make denser, stronger, or purer; and/or become more intense.

concentration—the act or process of concentrating and/or something that is concentrated.

conduit—a tube, pipe, channel, and/or duct for conveying a fluid, wires, cables, and/or another conduit.

configure—to generally make suitable and/or fit for a specific use and/or situation.

connect—to substantially: physically or logically join; link; couple; and/or fasten two or more entities.

constrain—to substantially: restrict; limit; regulate; and/or restrain within bounds.

contain—to substantially: restrain; have; possess; store; hold; and/or keep within limits.

container—a structure configured to at least partially contain, retain, and/or restrain one or more objects.

continuous—in a manner substantially uninterrupted in time, sequence, substance, and/or extent, and/or substantially without cessation.

corresponding—related, associated, accompanying, similar in purpose and/or position, conforming in every respect, and/or equivalent and/or agreeing in amount, quantity, magnitude, quality, and/or degree.

couple—to substantially: join; connect; and/or link two things together.

course—a generally continuous layer of building material, such as brick, block, or tile, such as used to form a wall.

create—to substantially: make; form; produce; generate; bring into being; and/or cause to exist.

cross-section—a section formed by a plane cutting through an object at a right angle to an axis.

define—to generally establish the meaning, relationship, outline, form, and/or structure of; and/or to precisely and/or distinctly describe and/or specify.

despite—notwithstanding.

deter—to substantially: prevent; impede; minimize; discourage; and/or dissuade.

determine—to find out, obtain, calculate, decide, deduce, ascertain, and/or come to a decision, typically by investigation, reasoning, and/or calculation.

device—a machine, manufacture, and/or collection thereof diameter—a length of a straight line segment passing through a center of an object and terminating at the periphery thereof.

diminish—to substantially: lessen; lower; reduce; and/or minimize.

display—to present and/or exhibit.

distal—farther to a point of reference, such as a portion of an extended hand that is further from the face.

distance—a measure of physical and/or logical separation.

downward—generally in, to, and/or toward a lower place, level, and/or position.

drip irrigation—an irrigation method that can save water and/or fertilizer by delivering water slowly to the base and/or roots of plants via a network of valves, pipes, tubing, hoses, and/or emitters. Also known as trickle irrigation, micro irrigation, and/or localized irrigation.

each—every one of a group considered individually.

earthen—related to the earth.

economical—cost effective and/or relatively inexpensive.

economically—configured to save money, such as by efficient operation and/or elimination of unnecessary features.

elongate—having a length that is generally greater than its width.

embodiment—an implementation, manifestation, and/or a concrete representation, such as of a concept.

ergonomically—configured to maximize productivity by minimizing operator and/or user injury, fatigue, and/or discomfort.

erosion—a gradual wearing away of land surface materials, especially rocks, sediments, and soils, by the action of water and/or wind, the action typically involving the transfer of eroded material from one place to another.

estimate—(n) a calculated value approximating an actual value; (v) to calculate and/or determine approximately and/or tentatively.

exemplary—generally serving as an example, model, instance, and/or illustration.

existing—to be presently real and/or in actuality.

exposed—substantially displayed and/or readily visible when in operation.

extend—to move and/or reach spatially outward and/or away from.

face—a significant and/or prominent surface of an object and/or to be oriented in a direction of facilitate—to help bring about, encourage, and/or allow.

facing—a fascia, front, covering, and/or outer portion and/or layer.

fill—(v) to introduce a filling to a container during operation; (n) a filling.

filling—a content of a container.

for—with a purpose of form—to construct, create, build, make, and/or shape.

from—used to indicate a source, origin, and/or location thereof.

further—in addition.

generate—to create, produce, render, give rise to, and/or bring into existence.

green—living and/or alive with growing plants.

growing medium—a material configured to increase by natural development, as any living organism or part by assimilation of nutriment, and/or to increase in size or substance.

hanger—a support, such as a hook, strap, peg, and/or loop, on and/or by which something may be hung.

having—possessing, characterized by, comprising, and/or including but not limited to.

healthy—generally vigorous, functioning well, and/or sound; and/or a positive descriptive of a person's or thing's physical state.

heat—(n.) energy associated with the motion of atoms and/or molecules and capable of being transmitted through solid media and fluid media by conduction, through fluid media by convection, and through fluid media and/or empty space by radiation; (v.) to transfer energy from one substance to another resulting in an increase in temperature of one sub stance.

hook—a curved and/or angular protrusion adapted to catch, pull, hold, and/or suspend something.

horizontal—substantially parallel to and/or in the plane of the horizon.

impede—to substantially: resist; retard; obstruct; hinder; and/or at least partially block.

including—having, but not limited to, what follows.

initialize—to prepare something for use and/or some future event.

install—to connect or set in position and prepare for use.

integral—formed or united into another entity.

interface—(n) a common point, boundary, and/or surface at and/or across which two bodies, objects, and/or independent systems meet, act on, and/or communicate with each other; and/or (v) to connect with and/or interact with by way of an interface.

interlock—to substantially: unite and/or join closely.

into—to a condition, state, or form of, and/or toward, in the direction of, and/or to the inside of.

irrigation—the artificial application of water to land, soil, and/or the earth to assist in the germination, growth, maintenance, and/or production of plants.

is—to exist in actuality.

larger—more or greater in magnitude.

lattice—a generally open, patterned framework and/or a structure formed of crossed and/or intersecting strips usually arranged to form a substantially diagonal pattern of open spaces between the strips.

lightweight—relatively low in weight.

living—alive and/or possessing life.

load—a weight or mass that is supported and/or the overall force to which a structure is subjected in supporting a weight or mass or in resisting externally applied forces.

locate—to situate in an approximate and/or particular spot, region, and/or position.

location—a place.

lockably—configured to lock.

long-term—lasting for greater than 5 years.

longitudinal—of and/or relating to a length; placed and/or running lengthwise.

longitudinal axis—a straight line defined generally parallel to an object's length and passing through a centroid of the object.

loss—a decline in amount and/or activity.

low—having little relative height; not high or tall; rising only slightly above surrounding surfaces; situated and/or or placed below normal height; situated below surrounding surfaces; near or at the horizon; below an average and/or a standard; and/or ranked near the beginning of an ascending series and/or scale.

manner—a mode of action.

material—a solid and/or extremely viscous substance and/or composition.

may—is allowed and/or permitted to, in at least some embodiments.

member—a structural unit and/or a distinct part of a whole.

mesh—a grid-like structure.

method—one or more acts that are performed upon subject matter to be transformed to a different state or thing and/or are tied to a particular apparatus, said one or more acts not a fundamental principal and not pre-empting all uses of a fundamental principal.

module—a construction component, usually designated by terms as, brick, block, tile, sheet, etc., which with other such preformed shapes assembled in repetitious juxtaposition define a surface of construction, e.g., of a wall, ceiling, and/or floor.

more—a quantifier meaning greater in size, amount, extent, and/or degree; and/or in addition to.

mount—(n) that upon which a thing is attached; (v) to couple, fix, secure, and/or attach on and/or to something.

movement—a change in place and/or position from one location to another.

multiple—more than one.

non-terminal—not terminal.

nondestructively—to perform without damaging.

obtain—to substantially: receive; get; take possession of; procure;

acquire; calculate; determine; and/or compute.

occupy—to substantially fill up a space.

offset—(v) to locate in a location near to but distinguishable from a given point or area; (n) a gap, located in a location near to but distinguishable from a given point or area, separated by a predetermined distance, and/or separated by more than an insubstantial distance.

once—a single time and/or occurrence.

one—being or amounting to a single unit, individual, and/or entire thing, item, and/or object.

open—(v) to substantially: interrupt; release from a closed and/or fastened position; remove obstructions from; and/or clear; (n) not substantially obstructed and/or closed.

opening—affording unobstructed entrance and exit; not shut or closed.

or—a conjunction used to indicate alternatives, typically appearing only before the last item in a group of alternative items.

other—a different and/or distinct entity and/or not the same as already mentioned and/or implied.

otherwise—under other circumstances and/or in other respects.

panel—a generally flat, usually rectangular piece and/or surface.

parallel—of, relating to, and/or designating lines, curves, planes, and/or surfaces everywhere approximately equidistant.

pass—to substantially: convey; transfer; and/or transmit and/or to move through, beyond, and/or with respect to, without local change of direction.

passage—a path, channel, and/or duct through, over, and/or along which something may pass; a motion of a first object relative to a second object; and/or a transfer, conveyance, and/or transmission.

pattern—a characteristic form.

penetrate—to substantially: enter; pass into; permeate; diffuse through; and/or force a way into.

per—to, for, and/or by each; for every; according to; by: by means of; through; and/or for each one.

perpendicular—intersecting at and/or forming substantially right angles; substantially at a right angle with respect to an axis; and/or of, relating to, and/or designating two or more locally straight coplanar lines and/or two or more locally flat planes that intersect at approximately a right angle.

planar—shaped as a substantially flat two-dimensional surface.

plane—a substantially flat surface and/or a surface containing all the straight lines that connect any two points on it.

plant—(n) any of various photosynthetic, eukaryotic, multicellular organisms of the kingdom Plantae characteristically producing embryos, containing chloroplasts, having cellulose cell walls, and lacking the power of locomotion, e.g., crops, grains, tobacco, trees, nuts, flowers, vegetables, fruits, berries, and/or produce, etc.; (v) to sow and/or place seeds or young plants in soil, land, and/or a container generally suitable for growing.

plant growing medium—any material capable of supporting plant life including soil, sand, and/or compost.

plantable—configured to continually and vigorously sustain plants.

plurality—the state of being plural and/or more than one.

polymer—a chemical compound and/or mixture of compounds formed by polymerization (a chemical reaction in which two or more molecules (often called "monomers") combine via covalent chemical bonds to form larger molecules that contain repeating structural units). Examples of polymers include ABS's, polyacetates, polyacrylics, alkyds, epoxies, flourothermoplastics, liquid crystal polymers, nylons, styrene acrylonitriles, polybutylene terephthalates, polycarbonates, thermoplastic elastomers, polyketones, polypropylenes, polyethylenes, polystyrenes, PVC's, polyesters, polyurethanes, thermoplastic rubbers, and/or polyamides, etc.

portion—a part, component, section, percentage, ratio, and/or quantity that is less than a larger whole and that can be visually, physically, and/or virtually distinguishable and/or non-distinguishable.

position—(n) a predetermined, proper, and/or appropriate place, location, arrangement, situation, and/or role; (v) to put in a predetermined, proper, and/or appropriate place, location, arrangement, situation, and/or role.

post—a vertical support and/or structure.

pre-bent—previously bent.

predetermined—established in advance.

prevent—to substantially: impede; resist; hinder; avert; stop; and/or keep from happening.

probability—a quantitative representation of a likelihood of an occurrence.

problem—a challenge, opportunity, question to be considered, solved, and/or answered, and/or a situation, matter, and/or person that presents perplexity and/or difficulty.

project—to calculate, estimate, or predict.

provide—to substantially: furnish; supply; give; convey; send; and/or make available.

rail—a bar, wall, and/or supporting member running between two other supporting members.

receive—to substantially: gather; take; acquire; obtain; accept; get; and/or have bestowed upon.

recommend—to suggest, praise, commend, and/or endorse.

relative—considered with reference to and/or in comparison to something else.

releaseably—configured to be non-destructively freed from something that binds, fastens, and/or holds back.

removable—configured to be non-destructively moved from a place and/or position occupied.

remove—to substantially: eliminate; remove; delete; and/or move from a place and/or position occupied.

repeatedly—again and again; repetitively.

request—to express a desire for and/or ask for.

resist—to substantially: avoid; act; and/or remain firm against and/or in opposition to the actions, effects, and/or force of restrain—to substantially: limit and/or restrict.

restrainer—a device configured to restrain movement, in at least one direction, of an object in contact therewith.

restrict—to keep within limits.

retain—to substantially: restrain; keep; and/or hold.

roller—any of various cylindrical or spherical devices that can roll, rotate, and/or provide at least a partial circumferential surface with respect to an axis of revolution, and/or any device that geometrically and/or functionally resembles a roller.

root—the usually underground portion of a plant that lacks buds, leaves, or nodes and serves as support, draws minerals and/or water from the surrounding soil, and/or sometimes stores food, and/or an underground stem such as a rhizome, corm, and/or tuber.

running bond—an arrangement of stacked horizontally-extending courses where each member of any given course overlapped by at least two members of an immediately adjacent course that is positioned directly above the given course.

secure—to substantially: fasten; stabilize; contain; anchor; and/or resist movement.

securement—a device and/or assembly configured to secure an article.

select—to choose and/or make a choice or selection from alternatives.

semi-circular—substantially resembling one-half of a circle.

separate—(n) distinct and/or be positioned intermediate to; (v) to substantially: disunite; space; set; and/or keep apart;

set—a related plurality of predetermined elements; and/or one or more distinct items and/or entities having a specific common property or properties.

shaped—having the general form and/or contour of.

short—less than a predetermined dimension, duration, and/or scope.

side—a surface bounding a solid object.

slope—a stretch of ground forming a natural or artificial incline, or, with respect to a first point and a second point that are intersected by a straight line, a ratio of the change in the ordinal value from the first point to the second point, to the change in the abscissal value from the first point to the second point; and/or a measure of a degree of inclination; and/or a rate of change.

sock—an elongated tubular container having a mesh wall and/or one or more closed and/or closeable ends.

solid—neither liquid nor gaseous, but instead of definite shape and/or form.

solve—to find an answer to a problem.

some—a subset of.

sound—a sensation produced by stimulation of the organs of hearing by vibrations transmitted through the air and/or other medium.

space—a gap.

stabilize—to make and/or keep stable.

stable—substantially: steady in position and/or balance; firm; lasting; and/or permanent.

stack—to create a generally orderly pile and/or group, especially one arranged in and/or defined by layers.

stop—(n.) a device configured to halt, constrain, resist, and/or prevent movement of another device.

strap—a relatively thin band, having an elliptical, rectangular, and/or polygonal cross-section, and used for fastening and/or clamping one or more objects together and/or into position.

stress—an applied force or system of forces that tends to strain and/or deform a body, and/or the internal resistance of a body to such an applied force or system of forces.

structure—a device; that which is complexly constructed, such as a building and/or an addition to a building; and/or a manner in which components are organized and/or form a whole.

substantially—as would be understood by a person having ordinary skill in the art of the claimed subject matter: approximately and/or to a very considerable, large, and/or great, but not necessarily absolutely whole and/or entire, extent and/or degree; and if not understood by a person having ordinary skill in the art, then deviating from by no more than ten percent (10%) from absolute.

such that—in a manner that results in.

support—to substantially bear the weight of, especially from below.

surface—the outer boundary of an object or a material layer constituting or resembling such a boundary.

sustain—to substantially: maintain; retain; and/or carry on.

system—a collection of mechanisms, devices, machines, articles of manufacture, processes, data, and/or instructions, the collection designed to perform one or more specific functions.

terminal—a final, ending, and/or last member; and/or of, at, relating to, and/or forming a limit, boundary, extremity, and/or end.

that—a pronoun used to indicate a thing as indicated, mentioned before, present, and/or well known.

through—across, among, between, and/or in one side and out the opposite and/or another side of to—a preposition configured for use for expressing purpose.

transfer—(n) a transmission from one device, place, and/or state to another. (v) to convey from one device, place, and/or state to another.

transform—to change in measurable: form, appearance, nature, and/or character.

tray—a generally shallow receptacle with a raised edge or rim, and configured to be used for holding articles.

trough-like—a generally long, narrow, open-topped, and shallow receptacle.

tubular—generally shaped like a tube and/or pipe; and/or having a hollow, approximately cylindrical shape.

two—a cardinal number equal to one plus one.

uniquely—unambiguously, clearly, and/or with a very low margin for error.

upward—in, to, and/or toward a higher place, level, and/or position.

vegetated—substantially covered with plants.

vertical—approximately perpendicular to horizontal.

via—by way of, with, and/or utilizing.

wall—a partition, structure, and/or mass that serves to at least partially enclose, divide, separate, segregate, define, secure, stabilize, and/or Systems, Devices, and/or Methods for Covering Structures protect a volume of material, such as earth, an earthen slope, and/or an earthen mound.

washout—a relatively rapid form of erosion and/or transport of soil and/or sand by water from an established location.

water—a transparent, odorless, tasteless liquid containing approximately 11.188 percent hydrogen and approximately 88.812 percent oxygen, by weight, characterized by the chemical formula H2O, and, at standard pressure (approximately 14.7 psia), freezing at approximately 32° F. or 0 C and boiling at approximately 212° F. or 100 C.

weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.

wherein—in regard to which; and; and/or in addition to.

which—a pronoun adapted to be used in clauses to represent a specified antecedent; what particular one or ones.

wire—an elongated metal or metal-based material, wherein all the diameters of the cross-sectional area taken at right angles to its length are of substantially the same dimension, and the cross-sectional area is small enough to allow significant flexibility and/or resiliency and permit bending and/or flexing without substantial metal flow.

with—accompanied by.

within—substantially inside the limits of.

yet—not thus far.

zone—an area and/or region distinguished from adjacent parts by a distinctive feature and/or characteristic.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly inoperable or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential";

any two or more described substances can be mixed, combined, reacted, separated, and/or segregated;

any described characteristics, functions, activities, substances, and/or structural elements can be combined, integrated, segregated, and/or duplicated;

any described activity can be performed manually, semi-automatically, and/or automatically;

any described activity can be repeated, any activity can be combined with any other described activity, performed by multiple entities, and/or performed in multiple jurisdictions; and any described characteristic, function, activity, substance, and/or structural element can be specifically excluded, the sequence of activities can vary, and/or the interrelationship of structural elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim of this document is intended to invoke 35 USC 112(f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document.

What is claimed is:

1. A support system for a green wall, the support system comprising a plurality of elongate, top-less, trough-like trays, wherein:
   the trays are configured to resist vertical movement of a plurality of elongate containers once the containers are installed in the trays, the containers configured to contain plant growing medium, the containers arranged to define a stacked plurality of substantially horizontally-extending courses;
   the trays are configured to resist horizontal movement of the containers once the containers are installed in the trays; and
   each of the trays is configured to secure a corresponding tubular irrigation conduit that extends substantially parallel to and substantially below the corresponding course of the stacked plurality of substantially horizontally-extending courses.

2. The system of claim 1, further comprising:
   the trays are configured to securely, yet non-destructively removeably, attach to a securement system.

3. The system of claim 1, further comprising:
   a first tray of the plurality trays comprises a tray bottom portion that is substantially solid and comprises a plurality of ribs that are configured to retain a predetermined amount of water in the tray bottom portion.

4. The system of claim 1, further comprising:
   the plurality of containers.

5. The system of claim 1, further comprising:
   the irrigation conduit.

6. The system of claim 1, further comprising:
   a restrainer configured to secure a container to a tray and/or a securement system.

7. The system of claim 1, wherein:
   each tray is configured to be located substantially horizontally and/or substantially vertically adjacent to one or more growing zones, each growing zone defined by one or more of the containers, each growing zone not occupied by a tray.

8. The system of claim 1, wherein:
   each tray defines a longitudinal axis that is configured to extend substantially parallel to a longitudinal axis of each container installed in that tray.

9. The system of claim 1, wherein:
   a first tray of the plurality of trays defines a plurality of substantially solid tray bottom portions.

10. The system of claim 1, wherein:
    one or more of the trays is substantially semi-annular in longitudinal cross-section.

11. The system of claim 1, wherein:
one or more of the trays is configured to non-destructively releasably lockably attach to a securement system.

12. The system of claim 1, wherein:
one or more of the trays comprises one or more tray support members that is configured to be supported by a securement system.

13. The system of claim 1, wherein:
one or more of the trays comprises one or more substantially downward-opening hook-shaped tray hangers that is configured to be supported by a substantially horizontally-extending elongate member of a securement system.

14. The system of claim 1, wherein:
one or more of the trays comprises one or more tray securement members that is configured to securely, yet non-destructively removeably, attach to a securement system.

15. The system of claim 1, wherein:
one or more of the trays comprises one or more substantially upward-opening hook-shaped tray securement members that is configured to securely, yet non-destructively removeably, attach to a substantially horizontally-extending elongate member of a securement system.

16. The system of claim 1, wherein:
one or more of the trays comprises an apertured portion.

17. The system of claim 1, wherein:
one or more of the trays is configured to allow plant roots to extend substantially downwards from the containers.

18. The system of claim 1, wherein:
the system is configured to provide an exposed face for the green wall that is plantable to form a vegetated living wall.

* * * * *